[12] United States Patent
Boudreault et al.

US009260767B2

(10) Patent No.: US 9,260,767 B2
(45) Date of Patent: Feb. 16, 2016

(54) PROCESSES FOR RECOVERING RARE EARTH ELEMENTS FROM ALUMINUM-BEARING MATERIALS

(75) Inventors: Richard Boudreault, St-Laurent (CA); Denis Primeau, Ste-Julie (CA); Heinz Krivanec, Oberwaltersdorf (AT); Carsten Dittrich, Aachen (DE); Joel Fournier, Carignan (CA); Raymond Simoneau, Montreal (CA); Maria Christina Garcia, Montreal (CA)

(73) Assignee: ORBITE TECHNOLOGIES INC., St-Laurent (CA)

( * ) Notice: Subject to any disclaimer, the term of this patent is extended or adjusted under 35 U.S.C. 154(b) by 226 days.

(21) Appl. No.: 14/005,885

(22) PCT Filed: Mar. 19, 2012

(86) PCT No.: PCT/CA2012/000253
§ 371 (c)(1),
(2), (4) Date: Feb. 25, 2014

(87) PCT Pub. No.: WO2012/126092
PCT Pub. Date: Sep. 27, 2012

(65) Prior Publication Data
US 2015/0307965 A1  Oct. 29, 2015

Related U.S. Application Data

(60) Provisional application No. 61/454,211, filed on Mar. 18, 2011, provisional application No. 61/535,435, filed on Sep. 16, 2011.

(51) Int. Cl.
| | |
|---|---|
| C22B 21/00 | (2006.01) |
| C22B 59/00 | (2006.01) |
| C22B 3/10 | (2006.01) |
| C22B 3/44 | (2006.01) |
| C22B 58/00 | (2006.01) |
| C22B 26/12 | (2006.01) |
| C22B 34/34 | (2006.01) |
| C22B 3/06 | (2006.01) |
| C22B 3/46 | (2006.01) |
| C22B 34/12 | (2006.01) |
| C01G 1/02 | (2006.01) |
| C01F 7/06 | (2006.01) |
| C01F 7/30 | (2006.01) |
| C01F 7/22 | (2006.01) |
| C01G 23/04 | (2006.01) |
| C01G 3/02 | (2006.01) |
| C01G 5/00 | (2006.01) |
| C01G 7/00 | (2006.01) |
| C01G 49/02 | (2006.01) |
| C01G 9/02 | (2006.01) |
| C01G 51/04 | (2006.01) |
| C01G 39/02 | (2006.01) |
| C01G 43/01 | (2006.01) |
| C01G 53/04 | (2006.01) |
| C01G 45/02 | (2006.01) |
| C01G 55/00 | (2006.01) |

(Continued)

(52) U.S. Cl.
CPC ............... *C22B 59/00* (2013.01); *C01B 13/18* (2013.01); *C01D 1/00* (2013.01); *C01F 5/02* (2013.01); *C01F 7/066* (2013.01); *C01F 7/22* (2013.01); *C01F 7/306* (2013.01); *C01F 15/00* (2013.01); *C01F 17/0043* (2013.01); *C01G 1/02* (2013.01); *C01G 3/02* (2013.01); *C01G 5/00* (2013.01); *C01G 7/00* (2013.01); *C01G 9/02* (2013.01); *C01G 23/04* (2013.01); *C01G 39/02* (2013.01); *C01G 43/01* (2013.01); *C01G 45/02* (2013.01); *C01G 49/02* (2013.01); *C01G 51/04* (2013.01); *C01G 53/04* (2013.01); *C01G 55/004* (2013.01); *C22B 3/06* (2013.01); *C22B 3/10* (2013.01); *C22B 3/44* (2013.01); *C22B 3/46* (2013.01); *C22B 21/0023* (2013.01); *C22B 26/12* (2013.01); *C22B 34/1245* (2013.01); *C22B 34/34* (2013.01); *C22B 58/00* (2013.01)

(58) Field of Classification Search
None
See application file for complete search history.

(56) References Cited

U.S. PATENT DOCUMENTS

| 558,726 A | 4/1896 | Gooch |
| 650,763 A | 5/1900 | Raynaud |

(Continued)

FOREIGN PATENT DOCUMENTS

| AU | 631226 | 2/1991 |
| AU | 4375001 | 12/2001 |

(Continued)

OTHER PUBLICATIONS

English Abstract of CN101285127, published on Oct. 15, 2008.

(Continued)

*Primary Examiner* — Steven Bos
(74) *Attorney, Agent, or Firm* — Bereskin & Parr LLP/S.E.N.C.R.L., s.r.l.

(57) ABSTRACT

The present disclosure relates to processes for recovering rare earth elements from an aluminum-bearing material. The processes can comprise leaching the aluminum-bearing material with an acid so as to obtain a leachate comprising at least one aluminum ion, at least one iron ion, at least one rare earth element, and a solid, and separating the leachate from the solid. The processes can also comprise substantially selectively removing at least one of the at least one aluminum ion and the at least one iron ion from the leachate and optionally obtaining a precipitate. The processes can also comprise substantially selectively removing the at least one rare earth element from the leachate and/or the precipitate.

20 Claims, 5 Drawing Sheets

(51) Int. Cl.
*C01B 13/18* (2006.01)
*C01D 1/00* (2006.01)
*C01F 5/02* (2006.01)
*C01F 15/00* (2006.01)
*C01F 17/00* (2006.01)

(56) References Cited

U.S. PATENT DOCUMENTS

| | | |
|---|---|---|
| 1,494,029 A | 5/1924 | Scofield et al. |
| 1,501,873 A | 7/1924 | Tyrer |
| 1,519,880 A | 12/1924 | Heinrich et al. |
| 1,701,510 A | 2/1929 | Sieurin |
| 1,760,962 A | 6/1930 | Phillips et al. |
| 1,778,083 A | 10/1930 | Marburg |
| 1,906,467 A | 5/1933 | Heath |
| 1,931,515 A | 10/1933 | Fritz et al. |
| 1,956,139 A | 4/1934 | Staufer et al. |
| 1,962,498 A | 6/1934 | Frost |
| 1,999,773 A | 4/1935 | McMichael |
| 2,024,026 A | 12/1935 | Coleman et al. |
| 2,189,376 A | 2/1940 | Burman |
| 2,354,133 A | 7/1944 | Lyons |
| 2,376,696 A | 5/1945 | Hixson et al. |
| 2,406,577 A | 8/1946 | Alessandroni |
| 2,413,709 A | 1/1947 | Hoffman |
| 2,471,844 A | 5/1949 | Strelzoff |
| 2,489,309 A | 11/1949 | Mills et al. |
| 2,642,337 A | 6/1953 | Newsome |
| 2,648,595 A | 8/1953 | Kennedy |
| 2,663,620 A | 12/1953 | Hinsdale, III |
| 2,707,149 A | 4/1955 | McKinley |
| 2,722,471 A | 11/1955 | Hirsch et al. |
| 2,769,686 A | 11/1956 | Michener, Jr. et al. |
| 2,771,344 A | 11/1956 | Michel et al. |
| 2,780,525 A | 2/1957 | Wendell, Jr. et al. |
| 2,806,766 A | 9/1957 | Anderson |
| 2,815,264 A | 12/1957 | Calkins et al. |
| 2,824,783 A | 2/1958 | Peppard et al. |
| 2,848,398 A | 8/1958 | Inagaki |
| 2,914,381 A | 11/1959 | Wainer |
| 2,914,464 A | 11/1959 | Burton et al. |
| 2,992,893 A | 7/1961 | Soudan et al. |
| 3,013,859 A | 12/1961 | Kuhlman, Jr. et al. |
| 3,104,950 A | 9/1963 | Ellis |
| 3,159,452 A | 12/1964 | Lerner |
| 3,192,128 A | 6/1965 | Brandmair et al. |
| 3,211,521 A | 10/1965 | George et al. |
| 3,473,919 A | 10/1969 | Metcalfe et al. |
| 3,479,136 A | 11/1969 | Michener, Jr. et al. |
| 3,540,860 A | 11/1970 | Cochran |
| 3,545,920 A | 12/1970 | George et al. |
| 3,586,477 A | 6/1971 | Flood |
| 3,620,671 A | 11/1971 | Maurel et al. |
| 3,642,441 A | 2/1972 | Van Weert |
| 3,649,185 A | 3/1972 | Sato et al. |
| 3,658,483 A | 4/1972 | Lienau et al. |
| 3,682,592 A | 8/1972 | Kovacs |
| 3,751,553 A | 8/1973 | Oslo et al. |
| 3,816,605 A | 6/1974 | Schwandorf |
| 3,852,430 A | 12/1974 | Lienau et al. |
| 3,862,293 A | 1/1975 | Maurel et al. |
| 3,903,239 A | 9/1975 | Berkovich |
| 3,922,164 A | 11/1975 | Reid et al. |
| 3,944,648 A | 3/1976 | Solymar et al. |
| 3,946,103 A | 3/1976 | Hund |
| 3,957,504 A | 5/1976 | Ho et al. |
| 3,966,909 A | 6/1976 | Grunig et al. |
| 3,983,212 A | 9/1976 | Lowenstein et al. |
| 4,042,664 A | 8/1977 | Cardwell et al. |
| 4,045,537 A | 8/1977 | Hrishikesan |
| 4,048,285 A | 9/1977 | Szepesi et al. |
| 4,069,296 A | 1/1978 | Huang |
| 4,080,437 A | 3/1978 | Reh et al. |
| 4,091,085 A | 5/1978 | Reh et al. |
| 4,098,868 A | 7/1978 | Tolley |
| 4,107,266 A | 8/1978 | Bauer et al. |
| 4,107,281 A | 8/1978 | Reh et al. |
| 4,110,399 A | 8/1978 | Gaudernack et al. |
| 4,124,680 A | 11/1978 | Cohen et al. |
| 4,130,627 A | 12/1978 | Russ et al. |
| 4,133,677 A | 1/1979 | Matsui et al. |
| 4,151,267 A | 4/1979 | Puskas |
| 4,158,042 A | 6/1979 | Deutschman |
| 4,172,879 A | 10/1979 | Miller et al. |
| 4,177,242 A | 12/1979 | Cohen et al. |
| 4,193,968 A | 3/1980 | Sullivan et al. |
| 4,198,231 A | 4/1980 | Gusset |
| 4,198,823 A | 4/1980 | Mathues et al. |
| 4,222,989 A | 9/1980 | Belsky et al. |
| 4,224,287 A | 9/1980 | Ziegenbalg et al. |
| 4,226,844 A | 10/1980 | Reh et al. |
| 4,233,273 A | 11/1980 | Meyer et al. |
| 4,237,102 A | 12/1980 | Cohen et al. |
| 4,239,735 A | 12/1980 | Eisele et al. |
| 4,241,030 A | 12/1980 | Cohen et al. |
| 4,259,311 A | 3/1981 | Shah |
| 4,297,326 A | 10/1981 | Gjelsvik et al. |
| 4,318,896 A | 3/1982 | Schoonover |
| 4,362,703 A | 12/1982 | Boybay et al. |
| 4,370,422 A | 1/1983 | Panda et al. |
| 4,378,275 A | 3/1983 | Adamson et al. |
| 4,392,987 A | 7/1983 | Laine et al. |
| 4,402,932 A | 9/1983 | Miller et al. |
| 4,414,196 A | 11/1983 | Matsumoto et al. |
| 4,435,365 A | 3/1984 | Morris |
| 4,437,994 A | 3/1984 | Baker |
| 4,465,566 A | 8/1984 | Loutfy et al. |
| 4,465,659 A | 8/1984 | Cambridge et al. |
| 4,486,393 A | 12/1984 | Baksa et al. |
| 4,490,338 A | 12/1984 | De Schepper et al. |
| 4,530,819 A | 7/1985 | Czeglédi et al. |
| 4,560,541 A | 12/1985 | Davis |
| 4,567,026 A | 1/1986 | Lisowyj |
| 4,585,645 A | 4/1986 | Sucech |
| 4,634,581 A | 1/1987 | Cambridge et al. |
| 4,652,433 A | 3/1987 | Ashworth et al. |
| 4,676,838 A | 6/1987 | Franz et al. |
| 4,710,369 A | 12/1987 | Bergman |
| 4,741,831 A | 5/1988 | Grinstead |
| 4,797,271 A | 1/1989 | Fleming et al. |
| 4,816,233 A | 3/1989 | Rourke et al. |
| 4,820,498 A | 4/1989 | Newkirk |
| 4,826,671 A | 5/1989 | Arndt et al. |
| 4,830,507 A | 5/1989 | Bagatto et al. |
| 4,898,719 A | 2/1990 | Rourke et al. |
| 4,913,884 A | 4/1990 | Feuling |
| 4,938,871 A | 7/1990 | Musikas et al. |
| 4,965,053 A | 10/1990 | Herchenroeder et al. |
| 4,968,504 A | 11/1990 | Rourke et al. |
| 4,980,141 A | 12/1990 | Kimura et al. |
| 4,988,487 A | 1/1991 | Lai et al. |
| 4,995,984 A | 2/1991 | Barkatt et al. |
| 5,006,753 A | 4/1991 | Hasker et al. |
| 5,008,089 A | 4/1991 | Moody et al. |
| 5,011,665 A | 4/1991 | Cailly et al. |
| 5,015,447 A | 5/1991 | Fulford et al. |
| 5,019,362 A | 5/1991 | Rourke et al. |
| 5,030,424 A | 7/1991 | Fulford et al. |
| 5,035,365 A | 7/1991 | Birmingham |
| 5,037,608 A | 8/1991 | Tarcy et al. |
| 5,039,336 A * | 8/1991 | Feuling ............ 75/419 |
| 5,043,077 A | 8/1991 | Chandler et al. |
| 5,045,209 A | 9/1991 | Snyder et al. |
| 5,053,144 A * | 10/1991 | Szirmai et al. ............ 210/770 |
| 5,061,474 A | 10/1991 | Pauli et al. |
| 5,071,472 A | 12/1991 | Traut et al. |
| 5,080,803 A | 1/1992 | Bagatto et al. |
| 5,091,159 A | 2/1992 | Connelly et al. |
| 5,091,161 A | 2/1992 | Harris et al. |
| 5,093,091 A | 3/1992 | Dauplaise et al. |
| 5,104,544 A | 4/1992 | Shimizu et al. |
| 5,106,797 A | 4/1992 | Allaire |
| 5,112,534 A | 5/1992 | Guon et al. |
| 5,120,513 A | 6/1992 | Moody et al. |

(56) References Cited

U.S. PATENT DOCUMENTS

| | | |
|---|---|---|
| 5,124,008 A | 6/1992 | Rendall et al. |
| 5,149,412 A | 9/1992 | Allaire |
| 5,160,482 A | 11/1992 | Ash et al. |
| 5,180,563 A | 1/1993 | Lai et al. |
| 5,188,809 A | 2/1993 | Crocker et al. |
| 5,192,443 A | 3/1993 | Delloye et al. |
| 5,244,649 A | 9/1993 | Ostertag et al. |
| 5,274,129 A | 12/1993 | Natale et al. |
| 5,368,736 A | 11/1994 | Horwitz et al. |
| 5,409,677 A | 4/1995 | Zinn |
| 5,409,678 A | 4/1995 | Smith et al. |
| 5,433,931 A | 7/1995 | Bosserman |
| 5,443,618 A | 8/1995 | Chapman |
| 5,492,680 A | 2/1996 | Odekirk |
| 5,500,043 A | 3/1996 | Harada et al. |
| 5,505,857 A | 4/1996 | Misra et al. |
| 5,512,256 A | 4/1996 | Bray et al. |
| 5,531,970 A | 7/1996 | Carlson |
| 5,585,080 A | 12/1996 | Andersen et al. |
| 5,597,529 A | 1/1997 | Tack |
| 5,622,679 A | 4/1997 | Yuan et al. |
| 5,632,963 A | 5/1997 | Schwab et al. |
| 5,639,433 A | 6/1997 | Yuan et al. |
| 5,645,652 A | 7/1997 | Okinaka et al. |
| 5,665,244 A | 9/1997 | Rothenberg et al. |
| 5,720,882 A | 2/1998 | Stendahl et al. |
| 5,723,097 A | 3/1998 | Barnett et al. |
| 5,766,478 A | 6/1998 | Smith et al. |
| 5,787,332 A | 7/1998 | Black et al. |
| 5,792,330 A | 8/1998 | Petersen et al. |
| 5,795,482 A | 8/1998 | Ehle et al. |
| 5,868,935 A | 2/1999 | Sirkar et al. |
| 5,876,584 A | 3/1999 | Cortellini |
| 5,885,545 A | 3/1999 | Pitzer |
| 5,904,856 A | 5/1999 | Kvant et al. |
| 5,911,967 A | 6/1999 | Ruthner |
| 5,922,403 A | 7/1999 | Tecle |
| 5,942,199 A | 8/1999 | Jokinen et al. |
| 5,955,042 A | 9/1999 | Barnett et al. |
| 5,962,125 A | 10/1999 | Masaki |
| 5,993,758 A | 11/1999 | Nehari et al. |
| 5,997,828 A | 12/1999 | Rendall |
| 6,033,579 A | 3/2000 | Riemer et al. |
| 6,045,631 A | 4/2000 | Tarcy et al. |
| 6,077,486 A | 6/2000 | Spitzer |
| 6,093,376 A | 7/2000 | Moore |
| 6,153,157 A | 11/2000 | McLaughlin |
| 6,207,131 B1 | 3/2001 | Magyar et al. |
| 6,214,306 B1 | 4/2001 | Aubert et al. |
| 6,221,233 B1 | 4/2001 | Rendall |
| 6,238,566 B1 | 5/2001 | Yoshida et al. |
| 6,248,302 B1 | 6/2001 | Barnett et al. |
| 6,254,782 B1 | 7/2001 | Kreisler |
| 6,267,936 B1 | 7/2001 | Delmas et al. |
| 6,302,952 B1 | 10/2001 | Mobbs et al. |
| 6,309,441 B1 | 10/2001 | Benz et al. |
| 6,312,653 B1 | 11/2001 | Delmau et al. |
| 6,337,061 B1 | 1/2002 | Iyatomi et al. |
| 6,348,154 B1 | 2/2002 | Stewart |
| 6,383,255 B1 | 5/2002 | Sundkvist |
| 6,395,062 B2 | 5/2002 | Olafson et al. |
| 6,395,242 B1 | 5/2002 | Allen et al. |
| 6,406,676 B1 | 6/2002 | Sundkvist |
| 6,447,738 B1 | 9/2002 | Rendall et al. |
| 6,468,483 B2 | 10/2002 | Barnett et al. |
| 6,500,396 B1 | 12/2002 | Lakshmanan et al. |
| 6,524,549 B1 | 2/2003 | Mohri et al. |
| 6,565,733 B1 | 5/2003 | Sportel et al. |
| 6,576,204 B2 | 6/2003 | Johansen |
| 6,716,353 B1 | 4/2004 | Mirzadeh et al. |
| 6,843,970 B1 | 1/2005 | Hard |
| 6,893,474 B2 | 5/2005 | Jäfverström et al. |
| 7,090,809 B2 | 8/2006 | Harel et al. |
| 7,118,719 B2 | 10/2006 | Fugleberg |
| 7,182,931 B2 | 2/2007 | Turnbaugh, Jr. et al. |
| 7,220,394 B2 | 5/2007 | Sreeram et al. |
| 7,282,187 B1 | 10/2007 | Brown et al. |
| 7,294,319 B2 | 11/2007 | Lahtinen et al. |
| 7,381,690 B1 | 6/2008 | Ding et al. |
| 7,442,361 B1 | 10/2008 | Gloeckler et al. |
| 7,498,005 B2 | 3/2009 | Yadav |
| 7,651,676 B2 | 1/2010 | Beaulieu et al. |
| 7,781,365 B2 | 8/2010 | Okamoto |
| 7,837,961 B2 | 11/2010 | Boudreault et al. |
| 7,892,426 B2 | 2/2011 | Hayashi et al. |
| 7,906,097 B2 | 3/2011 | Beaulieu et al. |
| 8,038,969 B2 | 10/2011 | Kondo et al. |
| 8,147,795 B2 | 4/2012 | Dolling et al. |
| 8,216,532 B1 | 7/2012 | Vierheilig |
| 8,241,594 B2 | 8/2012 | Boudreault et al. |
| 8,287,826 B2 | 10/2012 | Pettey |
| 8,337,789 B2 | 12/2012 | Boudreault et al. |
| 8,568,671 B2 | 10/2013 | Guo et al. |
| 8,597,600 B2 | 12/2013 | Boudreault et al. |
| 2002/0014416 A1 | 2/2002 | Van Weert |
| 2002/0050230 A1 | 5/2002 | Meisen |
| 2002/0071802 A1 | 6/2002 | Fulton et al. |
| 2003/0075021 A1 | 4/2003 | Young et al. |
| 2003/0152502 A1 | 8/2003 | Lewis et al. |
| 2003/0183043 A1 | 10/2003 | Wai et al. |
| 2004/0042945 A1 | 3/2004 | Rao et al. |
| 2004/0062695 A1 | 4/2004 | Horwitz et al. |
| 2005/0166706 A1 | 8/2005 | Withers et al. |
| 2006/0018813 A1 | 1/2006 | Bray |
| 2006/0066998 A1 | 3/2006 | Ishiguro |
| 2007/0062669 A1 | 3/2007 | Song et al. |
| 2007/0278106 A1 | 12/2007 | Shaw |
| 2008/0047395 A1 | 2/2008 | Liu et al. |
| 2008/0069748 A1 | 3/2008 | Lien et al. |
| 2008/0115627 A1 | 5/2008 | Wang et al. |
| 2008/0286182 A1 | 11/2008 | Costa et al. |
| 2009/0241731 A1 | 10/2009 | Pereira et al. |
| 2009/0272230 A1 | 11/2009 | Mackowski et al. |
| 2010/0018347 A1 | 1/2010 | Holden et al. |
| 2010/0078382 A1 | 4/2010 | Naganawa et al. |
| 2010/0129277 A1 | 5/2010 | Kondo et al. |
| 2010/0150799 A1 | 6/2010 | Boudreault et al. |
| 2010/0160144 A1 | 6/2010 | Kim et al. |
| 2010/0260640 A1 | 10/2010 | Shindo et al. |
| 2010/0278720 A1 | 11/2010 | Wong et al. |
| 2010/0319491 A1 | 12/2010 | Sugahara et al. |
| 2010/0329970 A1 | 12/2010 | Lian et al. |
| 2011/0017020 A1 | 1/2011 | Homma et al. |
| 2011/0044869 A1 | 2/2011 | Boudreault et al. |
| 2011/0120267 A1 | 5/2011 | Roche |
| 2011/0182786 A1 | 7/2011 | Burba, III |
| 2012/0073407 A1 | 3/2012 | Drinkard, Jr. et al. |
| 2012/0237418 A1 | 9/2012 | Boudreault et al. |
| 2013/0052103 A1 | 2/2013 | Boudreault et al. |
| 2013/0233130 A1 | 9/2013 | Boudreault et al. |
| 2014/0065038 A1 | 3/2014 | Boudreault et al. |
| 2014/0286841 A1 | 9/2014 | Boudreault et al. |
| 2014/0301920 A1 | 10/2014 | Boudreault et al. |
| 2014/0341790 A1 | 11/2014 | Kasaini |
| 2014/0356262 A1 | 12/2014 | Ruth et al. |
| 2014/0369904 A1 | 12/2014 | Boudreault et al. |
| 2014/0369907 A1 | 12/2014 | Boudreault et al. |
| 2014/0373683 A1 | 12/2014 | Boudreault et al. |

FOREIGN PATENT DOCUMENTS

| | | |
|---|---|---|
| CA | 1066872 | 11/1979 |
| CA | 1088961 | 11/1980 |
| CA | 1136380 | 11/1982 |
| CA | 1176470 | 10/1984 |
| CA | 1224327 | 7/1987 |
| CA | 1226719 | 9/1987 |
| CA | 2027519 | 4/1991 |
| CA | 2027973 | 4/1991 |
| CA | 2029623 | 5/1991 |
| CA | 2036058 | 8/1991 |
| CA | 2097809 | 7/1992 |
| CA | 2137249 | 12/1993 |
| CA | 2122364 | 2/1994 |

(56) References Cited

FOREIGN PATENT DOCUMENTS

| | | |
|---|---|---|
| CA | 2156295 | 9/1994 |
| CA | 2160488 | 11/1994 |
| CA | 2193726 | 1/1996 |
| CA | 2159534 | 4/1996 |
| CA | 2167890 | 7/1996 |
| CA | 2240067 | 6/1997 |
| CA | 2251433 | 4/1999 |
| CA | 2360447 | 8/2000 |
| CA | 2306015 | 12/2000 |
| CA | 2309225 | 12/2000 |
| CA | 2377600 | 1/2001 |
| CA | 2317692 | 3/2001 |
| CA | 2391394 | 5/2001 |
| CA | 2400673 | 8/2001 |
| CA | 2429889 | 6/2002 |
| CA | 2431466 | 6/2002 |
| CA | 2433448 | 7/2002 |
| CA | 2189631 | 11/2002 |
| CA | 2454812 | 2/2003 |
| CA | 2468885 | 7/2003 |
| CA | 2471179 | 7/2003 |
| CA | 2378721 | 9/2003 |
| CA | 2484134 | 11/2003 |
| CA | 2467288 | 11/2004 |
| CA | 2548225 | 11/2004 |
| CA | 2385775 | 5/2005 |
| CA | 2556613 | 8/2005 |
| CA | 2572190 | 1/2006 |
| CA | 2597440 | 8/2006 |
| CA | 2521817 | 3/2007 |
| CA | 2624612 | 4/2007 |
| CA | 2629167 | 5/2007 |
| CA | 2639796 | 6/2007 |
| CA | 2636379 | 7/2007 |
| CA | 2641919 | 8/2007 |
| CA | 2538962 | 9/2007 |
| CA | 2608973 | 1/2008 |
| CA | 2610918 | 2/2008 |
| CA | 2659449 | 2/2008 |
| CA | 2684696 | 11/2008 |
| CA | 2685369 | 11/2008 |
| CA | 2711013 | 11/2008 |
| CA | 2697789 | 3/2009 |
| CA | 2725391 | 11/2009 |
| CA | 2678724 | 3/2010 |
| CA | 2745572 | 7/2010 |
| CA | 2747370 | 7/2010 |
| CA | 2667029 | 11/2010 |
| CA | 2667033 | 11/2010 |
| CA | 2678276 | 3/2011 |
| CA | 2773571 | 3/2011 |
| CA | 2788965 | 8/2011 |
| CA | 2797561 | 11/2011 |
| CA | 2834356 | 12/2012 |
| CA | 2884787 | 4/2013 |
| CA | 2860491 | 8/2013 |
| CN | 1099424 | 3/1995 |
| CN | 101792185 | 8/2010 |
| EP | 157503 | 10/1985 |
| EP | 0054976 | 7/1986 |
| EP | 0238185 | 9/1987 |
| EP | 0327234 | 8/1989 |
| EP | 0382383 | 8/1990 |
| EP | 0399786 | 11/1990 |
| EP | 508676 | 10/1992 |
| EP | 466338 | 12/1995 |
| EP | 0449942 | 4/1996 |
| EP | 07755753 | 5/1997 |
| EP | 0829454 | 3/1998 |
| EP | 0692035 | 4/1998 |
| EP | 0834584 | 4/1998 |
| EP | 999185 | 5/2000 |
| EP | 1496063 | 1/2005 |
| EP | 2241649 | 10/2010 |
| EP | 2298944 | 3/2011 |
| GB | 120035 | 3/1919 |
| GB | 195295 | 3/1923 |
| GB | 230916 | 3/1925 |
| GB | 240834 | 5/1926 |
| GB | 241184 | 5/1926 |
| GB | 273999 | 7/1927 |
| GB | 409710 | 5/1934 |
| GB | 470305 | 8/1937 |
| GB | 480921 | 3/1938 |
| GB | 490099 | 8/1938 |
| GB | 574818 | 1/1946 |
| GB | 857245 | 12/1960 |
| GB | 858026 | 1/1961 |
| GB | 1056488 | 1/1967 |
| GB | 1307319 | 2/1973 |
| GB | 2013164 | 8/1979 |
| JP | 05287405 | 11/1993 |
| JP | 6056429 | 3/1994 |
| WO | 8603521 | 6/1986 |
| WO | 9103424 | 3/1991 |
| WO | 9213637 | 8/1992 |
| WO | 9600698 | 1/1996 |
| WO | 9621619 | 7/1996 |
| WO | 9624555 | 8/1996 |
| WO | 9722554 | 6/1997 |
| WO | 0017408 | 3/2000 |
| WO | 0104366 | 1/2001 |
| WO | 2004056468 | 7/2004 |
| WO | 2004056471 | 7/2004 |
| WO | 2005123591 | 12/2005 |
| WO | 2006084682 | 8/2006 |
| WO | 2007074207 | 7/2007 |
| WO | 2007079532 | 7/2007 |
| WO | 2008067594 | 6/2008 |
| WO | 2008104250 | 9/2008 |
| WO | 2008141423 | 11/2008 |
| WO | 2008154995 | 12/2008 |
| WO | 2009153321 | 12/2009 |
| WO | 2010002059 | 1/2010 |
| WO | 2010009512 | 1/2010 |
| WO | 2010056742 | 5/2010 |
| WO | 2010079369 | 7/2010 |
| WO | 2010133284 | 11/2010 |
| WO | 2011094858 | 8/2011 |
| WO | 2011100820 | 8/2011 |
| WO | 2011100821 | 8/2011 |
| WO | 2011147867 | 12/2011 |
| WO | 2012126092 | 9/2012 |
| WO | 2012149642 | 11/2012 |
| WO | 2013037054 | 3/2013 |
| WO | 2013142957 | 10/2013 |
| WO | WO2014029031 | 2/2014 |
| WO | 2014047728 | 4/2014 |
| WO | 2014075173 | 5/2014 |
| WO | 2014094155 | 6/2014 |
| WO | 2014094157 | 6/2014 |
| WO | 2014124539 | 8/2014 |

OTHER PUBLICATIONS

Bengston et al., "Alumina process feasibility study and preliminary pilot plant design. Task 3 report: preliminary design of 25 ton per day pilot plant.", vol. 1, Process Technology and Costs. Bureau of Mines Open File Report PB81-125031, 1979.

Adham et al., "Fluid Bed Dehydration of Magnesium Chloride", Magnesium Technology 2012, pp. 49-53.

English Abstract of CN1044126(C), "Stretched polypropylene film", published on Jul. 14, 1999.

Dutrizac et al., "Fundamentals of Serpentine Leaching in Hydrochloric Acid Media", Magnesium Technology 2000, pp. 41-51.

Australia Minerals & Mining Group Ltd., "AMMG Updates Process Design for HPA Chemical Project", Oct. 3, 2014.

Smirnov, V., "Alumina production in Russia Part I: Historical background", Journal of Materials, vol. 48, Issue 8, 1996, pp. 24-26.

Wei, X. et al., "Recovery of Iron and Aluminium from Acid Mine Drainage by selective precipitation", Environmental Engineering Science, vol. 22, No. 6, 2005, pp. 745-755.

(56) References Cited

OTHER PUBLICATIONS

An English translation of Zhang et al., "Research on the Kinetics of Alumina from Kaolinite Leaching in Sulphuric Acid", Journal of Hefei University of Technology, vol. 24, No. 1, Feb. 2001, pp. 71-74.
An English translation of Zhang et al., "Research of the Controlling Steps of the Reaction of Kaolin and Hydrochloric Acid", Journal of Hefei University of Technology, vol. 21, No. 1, Feb. 1998, pp. 50-53.
An English translation of Zhang et al., "Kinetics Research on Alumina in Kaolinite Leached by Hydrochloric Acid", Journal of Hefei University of Technology, vol. 22, No. 2, Apr. 1999, pp. 33-36.
Certification of translation from Park IP Translations dated May 14, 2012.
An English Abstract of CN101450811 "Method for extracting alumina from coal gangue", published on Jun. 10, 2009.
An English Abstract of JP2001162108 "Method for Manufacturing Iron-Aluminum Combined Flocculant", published on Jun. 19, 2001.
Tceisele, "Primary Metal Production", Dec. 3, 2007.
US EPA, "Alumina & Aluminum", Office of Resource Conservation and Recovery, Apr. 2, 2012.
Wahab et al., "Alumina Recovery From Iraqi Kaolinitic Clay by Hydrochloric Acid Route", Iraqi Bulletin of Geology and Mining, vol. 2, No. 1, 2006, pp. 67-76.
An English Abstract of CA1065068 "Method of Selectively Precipitating Metals From Solutions", published on Oct. 23, 1979.
English Translation of Abstract of CN101289705, "Process for abstracting vanadium from iron-smeltin waste slag of vanadium-containing iron ore", Jul. 14, 2010.
English Translation of Abstract of CN102220487, "Method for extracting vanadium and aluminum from vanadium-containing stone coal and clay vanadium ore", Oct. 19, 2011.
English Translation of Abstract of CN102241410, "Ecological and Comprehensive Utilization Method of Coal Ash", Nov. 16, 2011.
English Translation of Abstract of RU2363748, "Method of Producing Aluminium", Aug. 10, 2009.
English Translation of Abstract of ES2194586, "Separation procedure for contaminatory metals present in acid solutions involves liquid-liquid extraction with mixtures based on phosphonated dialkyl alkyl, trialkyl phosphates and acid phosphates", Mar. 1, 2005.
English Translation of Abstract of WO2009005115, "Composition for promotion of reduction in size of adipocyte", Jan. 8, 2009.
Cohen et al., "Precipitation of iron from concentrated chloride solutions: Literature observations, challenges and preliminary experimental results", Minerals Engineering 18 (2005), pp. 1344-1347.
Elmolla et al., "Effect of Photo-Fenton Operating Conditions on the Performance of Photo-Fenton-SBR Process for Recalcitrant Wastewater Treatment", Journal of Applied Sciences 10 (24): 3236-3242, 2010.
Gunnar et al., Abstract of "Extraction of iron compounds from wood from the Vasa", Department of Chemistry, Swedish University of Agricultural Sciences, vol. 60, No. 6, pp. 678-684, 2006.
Fang et al., "Recovery of gallium from coal fly ash", Hydrometallurgy 41 (1996) 187-200.
Gutiérrez et al., "Recovery of gallium from coal fly ash by a dual reactive extraction process", Waste Management & Research (1997) 16, 371-382.
English Translation of Abstract of CN101045538, "Method for preparing modified silicon oxide using coal series kaolin rock or flyash", Oct. 3, 2007.
English Translation of Abstract of CN101249965, "Method for preparing ultra-fine white carbon black and nano alumina by using kaolinite as raw material", Aug. 27, 2008.
English Translation of Abstract of CN101045543, "Method for preparing sheet alumina using coal series kaolin rock or flyash as raw material", Oct. 3, 2007.
English Translation of Abstract of CN101434484, "Processes for producing alumina ceramic valve body and use thereof", May 20, 2009.
English Translation of Abstract of CN101462757, "Preparation of nano Na-beat-alumina powder", Jun. 24, 2009.
Cablik, "Characterization and applications of red mud from bauxite processing", VSB-Technical University of Ostrava, Faculty of Mining and Geology, pp. 27-37, 2007.
An English Abstract of JP57145027 "Preparation of Granular Alumina", published on Sep. 7, 1982.
Abstract of Dash et al., "Acid dissolution of alumina from waste aluminium dross", Hydrometallurgy, vol. 92, issues 1-2, May 2008, pp. 48-53.
Khan et al., "Production of Aluminum Sulphate from Indigenous Bauxite without Precalcination of the Ore", Jour. Chem Soc. Pak., vol. 17, No. 4, pp. 213-216, 1995.
Sahoo et al., "Characterization of $\gamma$- and $\alpha$-Fe2O3 nano powders synthesized by emulsion precipitation-calcination route and rheological behavior of $\alpha$-Fe2O3", International Journal of Engineering, Science and Technology, vol. 2, No. 8, pp. 118-126, 2010.
Bharathi et al., "Highly mesoporous $\alpha$-Fe2O3 nanostructures: preparation, characterization and improved photocatalytic performance towards Rhodamine B (RhB)", J. Phys. D: Appl. Phys. 43 015501, pp. 1-9, 2010.
"Industrial Inorganic Pigments", Wiley—VCH Verlag GmbH and Co. KgaA, pp. 105-112, 1993.
Andrieux et al., Abstract of: "Hydrothermal synthesis of dioctahedral smectites: The Al—Fe3+ chemical series: Part I: Influence of experimental conditions", Universite de Poitiers, 2009.
Bazin et al., "Alumina from clays", Department of Mining, Metallurgical and Materials Engineering; Alcan International Limitee; Groupe Conseil PROCD Inc.; Conseil de Developpement economique de Murdochville, pp. 24-38, 2005.
Aleksandrovich, "The receipt of alumina from clay materials", 2011.
Copson et al., "Extraction of Alumina from Clays by the Lime-sinter Modification of the Pedersen Process", New York Meeting, Feb. 1944, pp. 241-254.
Al-Zahrani et al., "Extraction of Alumina from Local Clays by Hydrochloric Acid Process", JKAU: Eng. Sci., vol. 20, No. 2, pp. 29-41, 2009.
Dutrizac et al., "The Precipitation of Hematite from Ferric Chloride Media at Atmospheric Pressure", Mining and Mineral Sciences Laboratories, vol. 30B, Dec. 1999, pp. 993-1001.
Riveros et al., "The precipitation of hematite from ferric chloride media", Mining and Mineral Sciences Laboratories, Hydrometallurgy 46 (1997), pp. 85-104.
English Abstract of WO 2007122720, published on Nov. 1, 2007.
English Abstract of WO 2004085719, published on Oct. 7, 2004.
English Abstract of SU 1 734 395, published on Oct. 27, 1996.
English Abstract of RU2416655, published on Apr. 20, 2011.
English Abstract of RU2008113385, published on Oct. 20, 2009.
English Abstract of RU2361941, published on Jul. 20, 2009.
English Abstract of RU2257348, published on Jul. 27, 2005.
English Abstract of RU2247788, published on Mar. 10, 2005.
English Abstract of RU2236375, published on Sep. 20, 2004.
English Abstract of RU2205242, published on May 27, 2003.
English Abstract of RU2201988, published on Apr. 10, 2003.
English Abstract of RU2196184, published on Jan. 10, 2003.
English Abstract of RU2189358, published on Sep. 20, 2002.
English Abstract of RU2176680, published on Dec. 10, 2001.
English Abstract of RU2162898, published on Feb. 10, 2001.
English Abstract of RU2162112, published on Jan. 20, 2001.
English Abstract of RU2158170, published on Oct. 27, 2000.
English Abstract of RU2147623, published on Apr. 20, 2000.
English Abstract of RU2147622, published on Apr. 20, 2000.
English Abstract of RU2140998, published on Nov. 10, 1999.
English Abstract of RU2119816, published on Oct. 10, 1998.
English Abstract of KR20070028987, published on Mar. 13, 2007.
English Abstract of JP9324227, published on Dec. 16, 1997.
English Abstract of JP9324192, published on Dec. 16, 1997.
English Abstract of JP9291320, published on Nov. 11, 1997.
English Abstract of JP9249672, published on Sep. 22, 1997.
English Abstract of JP9248463, published on Sep. 22, 1997.
English Abstract of JP9208222, published on Aug. 12, 1997.
English Abstract of JP9194211, published on Jul. 29, 1997.
English Abstract of JP9176756, published on Jul. 8, 1997.
English Abstract of JP9143589, published on Jun. 3, 1997.
English Abstract of JP8232026, published on Sep. 10, 1996.

(56) References Cited

OTHER PUBLICATIONS

English Abstract of JP5051208, published on Mar. 2, 1993.
English Abstract of JP4198017, published on Jul. 17, 1992.
English Abstract of JP4183832, published on Jun. 30, 1992.
English Abstract of JP4046660, published on Feb. 17, 1992.
English Abstract of JP3173725, published on Jul. 29, 1991.
English Abstract of JP2179835, published on Jul. 12, 1990.
English Abstract of JP2080530, published on Mar. 20, 1990.
English Abstract of JP2011116622, published on Jun. 16, 2011.
English Abstract of JP2011046588, published on Mar. 10, 2011.
English Abstract of JP2010270359, published on Dec. 2, 2010.
English Abstract of JP2008194684, published on Aug. 28, 2008.
English Abstract of JP2007327126, published on Dec. 20, 2007.
English Abstract of JP2007254822, published on Oct. 4, 2007.
English Abstract of JP2006348359, published on Dec. 28, 2006.
English Abstract of JP2006028187, published on Feb. 2, 2006.
English Abstract of JP2005139047, published on Jun. 2, 2005.
English Abstract of JP2000313928, published on Nov. 14, 2000.
English Abstract of JP10158629, published on Jun. 16, 1998.
Wang et al., "Recovery of scandium from synthetic red mud leach solutions by solvent extraction with D2EHPA", Separation and Purification Technology (2013), pp. 1-14.
English Abstract of AU2008286599A1, "A process of smelting monazite rare earth ore rich in Fe", published on Feb. 19, 2009.
English Abstract of KR820001546, "Production of Titanium Metal Valves", published on Aug. 31, 1982.
English Abstract of KR100927466, published on Nov. 19, 2009.
English Abstract of RU 2 069 180, published on Nov. 20, 1996.
English Abstract of RU 2 068 392, published on Oct. 27, 1996.
English Abstract of RU 2 062 810, published on Jun. 27, 1996.
English Abstract of RU 2 055 828, published on Mar. 10, 1996.
English Abstract of RU 2 049 728, published on Dec. 10, 1995.
English Abstract of RU 1704483, published on Oct. 27, 1996.
English Abstract of SU1567518, published on May 30, 1990.
English Abstract of SU1424174, published on Jul. 23, 1991.
English Abstract of RU2038309, published on Jun. 27, 1995.
English Abstract of HU51574, published on May 28, 1990.
English Abstract of JP2008253142, published on Oct. 23, 2008.
English Abstract of JP2005152756, published on Jun. 16, 2005.
English Abstract of JP2005082462, published on Mar. 31, 2005.
English Abstract of JP2005219938, published on Aug. 18, 2005.
English Abstract of JP2004036003, published on Feb. 5, 2004.
English Abstract of JP2005112636, published on Apr. 28, 2005.
English Abstract of AU2737892, published on May 13, 1993.
English Abstract of CN102502745, published on Jun. 20, 2012.
Andritz Metals, "Regeneration Systems for Hydrochloric Waste Pickling Solutions", 2011.
Aluminium for Future Generations, "Bauxite Residual Management", http://bauxite.world-aluminium.org/refining/bauxite-residue-management.html.
Vedanta Aluminium Limited, Lanjigarh, "Red Mud Filtration and Recovery of Valuable Metals", 2001, http://marvels.engineeringwatch.in/eea025/.
English Abstract of WO2007082447, published on Jul. 26, 2007.
English Abstract of WO2011092292, published on Aug. 4, 2011.
English Abstract of JPH09249420, published on Nov. 22, 1997.
English Abstract of CN101157453, published on Apr. 9, 2008.
English Abstract of CN102515590, published on Jun. 27, 2012.
Hudson et al., "Direct Calcination of AICl3 •6H2O with Off-Gas use for Crystallization", United States Department of the Interior Bureau of Mines, Contract No. J0188096, 1979, pp. 1-28.
Elsner et al., "Alumina via hydrochloric acid leaching of high silica bauxites—Process Development", 1984, pp. 411-429.
Maysilles et al., "Aluminum Chloride Hexahydrate Crystallization by HCl Gas Sparging", U.S. Dept. of the Interior, Bureau of Mines, 1982, pp. 1-38.
Brand et al., "Formation of $\alpha$-Al2O3 by thermal decomposition of basic aluminum chlorides at low temperatures", Crystal Research and Technology 1989 (24) 671-675.
Park et al., "Manufacture of low-soda alumina from clay", Industrial and Engineering Chemistry 1996 (35) 4379-4385.
Yanagida et al., "The role of water vapor in formation of alpha alumina from transient alumina" Journal of Ceramic Association Japan 1966 (74) 371-77.
Pijolat et al., "Influence of additives and water vapor on the transformation of transition aluminas into alpha alumina", Thermochimica Acta 1987 (122) 71-77.
Bagwell et al., "Effect of seeding and water vapor on the nucleation and growth of $\alpha$-Al2O3 from $\gamma$-Al2O3", Journal of the American Ceramic Society 1999 (82) 825-832.
Hrabe et al., "The influence of water vapor on thermal transformations of boehmite", Journal of Material Research 1992 (7) 444-449.
English Abstract of Petzold et al., "Thermoanalytical studies on the decomposition of aluminum chloride hexahydrate", Journal of thermal analysis 1981 (20) 71-86.
Hoffman et al., "Development of a hydrochloric acid process for the production of alumina from clay", Journal of research of the national bureau of standards 1946 (37) 409-428.
Marchessaux et al., "Thermal decomposition of aluminum hexahydrate chloride (AICl3 $\times$ 6H2 O) for alumina production", Light metals 1979 (1) 189-204.
Miller et al., "Fluidized-bed decomposition of aluminum chloride hexahydrate", Light Metals: Proceedings of Sessions, AIME Annual Meeting (Warrendale, Pennsylvania), 1983 253-271.
English Abstract of CN101781719, "Method for recovering rare earth from oil shale waste slag", published on Jul. 21, 2010.
Liu et al., "High Purity Alumina Powders Extracted from Aluminum Dross by the Calcining-Leaching Process", TMS (The Minerals, Metals & Materials Society), 2011, pp. 197-200.
Kumar et al., "Refining of a low-grade molybdenite concentrate", Hydrometallurgy 86 (2007) 56-62.
Wang et al., "Metallurgical processes for scandium recovery from various resources: A review", Hydrometallurgy 108 (2011) 100-108.
English Abstract of BE1019347 (A3), published on Jun. 5, 2012.
Ajemba et al., "Application of the Shrinking Core Model to the Analysis of Alumina Leaching From Ukpor Clay Using Nitric Acid", International Journal of Engineering Research & Technology (IJERT), ISSN: 2278-0181, vol. 1 Issue 3, May 2012.
Zhou et al., "Extraction of Scandium from red mud by modified activated carbon and kinetics study", Rare Metals, vol. 27, No. 3, Jun. 2008, pp. 223-227.
English Abstract of RU 2 183 225, published on Jun. 10, 2002.
Wang et al., "A novel recovery process of metal values from the cathode active materials of the lithium-ion secondary batteries", Hydrometallurgy 99 (2009) 194-201.
English Abstract of CN101781719, published on Jul. 21, 2010.
English Abstract of JP2009249674, published on Oct. 29, 2009.
Abstract of Kao et al., "Solvent extraction of La(III) and Nd(III) from nitrate solutions with 2-ethylhexylphosphonic acid mono-2-ethylhexyl ester", Chemical Engineering Journal, vol. 119, Issues 2-3, Jun. 15, 2006, pp. 167-174.
Yatsenko et al., "Red Mud Pulp Carbonization with Scandium Extraction during alumina Production", ISSN 0040-5795, Theoretical Foundations of Chemical Engineering, 2010, vol. 44, No. 4, pp. 563-568.
Ouellet, Dissertation 9689, (Extraction de l'alumine de l'argile de la région de Murdochville, Québec, Canada), "Extraction of Alumina from Clay in the Murdochville region of Quebec", Canada—Universite Laval—Original French Version, Oct. 2004.
Ouellet, Dissertation 9689, (Extraction de l'alumine de l'argile de la région de Murdochville, Québec, Canada), "Extraction of Alumina from Clay in the Murdochville region of Quebec", Canada—Universite Laval—English Translation, Oct. 2004.
Translator Certification—Sep. 10, 2012.
English Translation of CN102452677, published on May 16, 2012.
English Abstract of CN102719674, "Method for extracting rare earth from oxidized neodymium iron boron waste", published on Oct. 10, 2012.
English Abstract of CN102694218, "Solvent extraction method of aluminum", published on Sep. 26, 2012.
English Abstract of CN102690954, "Back extraction and removement method for aluminium", published on Sep. 26, 2012.

(56) References Cited

OTHER PUBLICATIONS

English Abstract of CN102680423, "Method for fast detecting aluminum content", published on Sep. 19, 2012.
English Abstract of CN102643985, "Method for extracting valuable metals from high-iron bauxite with step-by-step acid leaching", published on Aug. 22, 2012.
English Abstract of CN102628105, "Method for comprehensively recycling and using baric waste slag in refined aluminum production process", published on Aug. 8, 2012.
Shanks et al., "Options in the HC1 process for the production of alumina from clay", Light Metals 1986, R.E. Miller, Editor, p. 1089.
English Abstract of JP10121164, published on May 12, 1998.
English Abstract of EP1817437, published on Aug. 15, 2007.
English Abstract of CN2292806, published on Sep. 30, 1998.
English Abstract of CN1986895, published on Jun. 27, 2007.
English Abstract of CN1796608, published on Jul. 5, 2006.
English Abstract of CN1699609, published on Nov. 23, 2005.
English Abstract of CN1410599, published on Apr. 16, 2003.
English Abstract of CN1397653, published on Feb. 19, 2003.
English Abstract of CN1192479, published on Sep. 9, 1998.
English Abstract of CN1478600, published on Mar. 3, 2004.
English Abstract of CN1140148, published on Jan. 15, 1997.
English Abstract of CN1127791, published on Jul. 31, 1996.
English Abstract of CN1131200, published on Sep. 18, 1996.
English Abstract of CN1061246, published on May 20, 1992.
English Abstract of CN1043752, published on Jul. 11, 1990.
English Abstract of CN102153128, published on Aug. 17, 2011.
English Abstract of CN102139943, published on Aug. 3, 2011.
English Abstract of CN102127641, published on Jul. 20, 2011.
English Abstract of CN102071317, published on May 25, 2011.
English Abstract of CN102071315, published on May 25, 2011.
English Abstract of CN102061392, published on May 18, 2011.
English Abstract of CN102030355, published on Apr. 27, 2011.
English Abstract of CN102021343, published on Apr. 20, 2011.
English Abstract of CN102011010, published on Apr. 13, 2011.
English Abstract of CN101824555, published on Sep. 8, 2010.
English Abstract of CN1045812, published on Oct. 3, 1990.
English Abstract of CN101407879, published on Apr. 15, 2009.
English Abstract of CN101307384, published on Nov. 19, 2008.
English Abstract of CN101161834, published on Apr. 16, 2008.
English Abstract of CN1844421, published on Oct. 11, 2006.
English Abstract of CN101182601, published on May 21, 2008.
English Abstract of CN1043752C, published on Jun. 23, 1999.
English Abstract of CN87101034, published on Aug. 28, 1991.
English Abstract of RU2079431, published on May 20, 1997.
English Abstract of RU2063458, published on Jul. 10, 1996.
English Abstract of RU 2 048 565, published on Nov. 20, 1995.
English Abstract of RU 2 040 587, published on Jul. 25, 1995.
English Abstract of RU 2 034 074, published on Apr. 30, 1995.
English Abstract of RU 2 031 168, published on Mar. 20, 1995.
English Abstract of RU 2 020 175, published on Sep. 30, 1994.
English Abstract of RU 2 010 876, published on Apr. 15, 1994.
English Abstract of RU 2 094 374, published on Oct. 27, 1997.
English Abstract of RU 2 081 831, published on Jun. 20, 1997.
English Abstract of RU 2 070 596, published on Dec. 20, 1996.
Becze et al., "Precipitation of Hematite and Recovery of Hydrochloric Acid from Concentrated Chloride Solutions by a Novel Hydrolytic Decomposition Process", TMS (The Minerals & Materials Society, 2001.
English Translation—Chi et al., Derwent Acc-No. 2010-L68306 for the patent family including CN 101811712 A, published on Apr. 27, 2010.
English Translation of CN102849765(A), "Method for preparing alumina from low-grade bauxite by acid leaching", published on Jan. 2, 2013.
English Translation of CN102849767(A), "Method for preparing alumina by using power plant fly ash", published on Jan. 2, 2013.
English Translation of CN103420405(A), "Method for extracting aluminum oxides from aluminum-containing waste residues", published on Dec. 4, 2013.
Demopoulos et al., "New Technologies for HCI Regeneration in Chloride Hydrometallurgy", World of Metallurgy—Erzmetall 61 (2008) No. 2.
English Abstract of CN1099424(A), "Method for treating blast furnace slag with diluted chlorhydric acid", published on Mar. 1, 1995.
English Abstract of CN103964480(A), "Processes for producing aluminum oxide by using hydrochloric acid method", published on Aug. 6, 2014.
English Abstract of CN203922759(U), "Devide for preparing aluminum oxide by roasting aluminum chloride heahydrate crystal through rotary kiln", published on Nov. 5, 2014.
English Abstract of EP0850881(A1), Processe and apparatus for the preparation of iron oxides solutions containing hydrochloric acid iron oxide chloride, published on Jul. 1, 1998.
English Abstract of JPH0543252A, "Method for Removing Halogen Radical in Ferric Oxide", published on Feb. 23, 1993.
English Abstract of JPH0656429(A), "Production of Plate-Like Oxide Particulate Powder", published on Mar. 1, 1994.
English Abstract of JPH04354836(A), "Method for Leaching Silicomagnesionickel Ore", Published on Dec. 9, 1992.
English Abstract of RU2158787(C2), "Process of winning of magnesium", published on Nov. 10, 2000.
English Abstract of RU2237111(C1), "Method of Recovering Magnesium from Silicon-Containing Wastes", published on Sep. 27, 2004.
English Abstract of WO2008070885(A2), "Method for Increasing the Specific Surface of Iron Oxides in Spray Roasting Plants", published on Jun. 19, 2008.
Perander et al., "The Nature and Impacts of Fines in Smelter-Grade Alumina", Journal of Minerals, Metals & Materials Society 61.11 (2009): 33-39. Springer Link. Web. Aug. 12, 2015. <http://link.springer.com/article/10.1007/02Fs11837-009-0164-x>.
Weissenbaeck et al., "Development of Chloride Based Metal Extraction Techniques", Paper presented at ALTA 2013, Perth, WA.

* cited by examiner

PROCESSES FOR RECOVERING RARE EARTH ELEMENTS FROM ALUMINUM-BEARING MATERIALS

CROSS-REFERENCE TO RELATED APPLICATIONS

The present application is a 35 USC 371 national stage entry of PCT/CA2012/000253 filed on Mar. 19, 2012 and which claims priority on U.S. 61/454,211 filed on Mar. 18, 2011 and on U.S. 61/535,435 filed on Sep. 16, 2011. These documents are hereby incorporated by reference in their entirety.

TECHNICAL FIELD

The present disclosure relates to improvements in the field of chemistry applied to the recovery, extraction and/or isolation of rare earth elements (REE). For example, such processes are useful for obtaining rare earth elements from various aluminum-bearing materials and derivatives thereof.

BACKGROUND OF THE DISCLOSURE

In various technologies, there is an increasing need for rare earth elements. In few countries, efforts to reestablish mining of rare earth elements have been undertaken. In the future, supplies of rare earth elements will considerably depend upon economic viability of the extraction and production processes and technological innovations requiring such rare earth elements.

There is thus a need for providing an alternative to the existing solutions for extracting rare earth elements.

SUMMARY OF THE DISCLOSURE

According to one aspect, there is provided a process for recovering at least one rare earth element from an aluminum-bearing material, the process comprising:
  leaching the aluminum-bearing material with an acid so as to obtain a leachate comprising aluminum ions, iron ions, and the at least one rare earth element;
  substantially selectively precipitating, extracting and/or isolating at least one of aluminum ions and iron ions from the leachate and optionally obtaining a precipitate; and
  substantially selectively precipitating, extracting and/or isolating the at least one rare earth element from the leachate and/or the precipitate.

According to one aspect, there is provided a process for extracting at least one rare earth element from an aluminum-bearing material, the process comprising:
  leaching the aluminum-bearing material with an acid so as to obtain a leachate comprising aluminum ions, iron ions, and the at least one rare earth element; and
  selectively precipitating at least one member chosen from the at least one rare earth element, iron ions and aluminum ions.

According to one aspect, there is provided a process for recovering at least one rare earth element from an aluminum-bearing material, the process comprising:
  leaching the aluminum-bearing material with an acid so as to obtain a leachate comprising aluminum ions, iron ions, and at least one rare earth element;
  optionally substantially selectively precipitating, extracting and/or isolating the at least one rare earth element from the leachate and/or the precipitate.
  substantially selectively precipitating, extracting and/or isolating at least one of aluminum ions and iron ions from the leachate and optionally obtaining a precipitate; and
  substantially selectively precipitating, extracting and/or isolating the at least one rare earth element from the leachate and/or the precipitate.

According to another example, there is provided a process for recovering at least one rare earth element from an aluminum-bearing material, the process comprising:
  leaching the aluminum-bearing material with an acid so as to obtain a leachate comprising at least one aluminum ion, at least one iron ion, the at least one rare earth element, and a solid, and separating the leachate from the solid;
  substantially selectively removing at least one of the at least one aluminum ion and the at least one iron ion from the leachate and optionally obtaining a precipitate; and
  substantially selectively removing the at least one rare earth element from the leachate and/or the precipitate.

According to another example, there is provided process for recovering at least one rare earth element from an aluminum-bearing material, the process comprising:
  leaching the aluminum-bearing material with an acid so as to obtain a leachate comprising at least one aluminum ion, at least one iron ion, and the at least one rare earth element, and a solid, and separating the leachate from the solid; and
  substantially selectively removing at least one member chosen from the at least one rare earth element, the at least one iron ion and the at least one aluminum ion from the leachate.

According to another aspect, there is provided a process for preparing alumina and other products, the process comprising:
  leaching an aluminum-containing material with HCl so as to obtain a leachate comprising aluminum ions and a solid, and separating the solid from the leachate;
  reacting the leachate with HCl so as to obtain a liquid and a precipitate comprising the aluminum ions in the form of $AlCl_3$, and separating the precipitate from the liquid;
  heating the precipitate under conditions effective for converting $AlCl_3$ into $Al_2O_3$ and recovering gaseous HCl so-produced; and
  recycling the gaseous HCl so-produced by contacting it with water so as to obtain a composition having a concentration higher than HCl azeotropic concentration (20.2 weight %) and reacting the composition with a further quantity of aluminum-containing material so as to leaching it.

According to another aspect, there is provided a process for preparing alumina and other products, the process comprising:
  leaching an aluminum-containing material with HCl so as to obtain a leachate comprising aluminum ions and a solid, and separating the solid from the leachate;
  reacting the leachate with HCl so as to obtain a liquid and a precipitate comprising the aluminum ions in the form of $AlCl_3$, and separating the precipitate from the liquid;
  heating the precipitate under conditions effective for converting $AlCl_3$ into $Al_2O_3$ and recovering gaseous HCl so-produced; and
  recycling the gaseous HCl so-produced by contacting it with water so as to obtain a composition having a concentration of about 25 to about 45 weight % and reacting the composition with a further quantity of aluminum-containing material so as to leaching it.

According to another aspect, there is provided a process for preparing alumina and other products, the process comprising:

leaching an aluminum-containing material with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid;

heating the precipitate under conditions effective for converting $AlCl_3$ into $Al_2O_3$ and recovering gaseous HCl so-produced; and recycling the gaseous HCl so-produced by contacting it with water so as to obtain a composition having a concentration of about 25 to about 45 weight % and using the composition for leaching the aluminum-containing material.

According to another aspect, there is provided a process for preparing alumina and other products, the process comprising:

leaching an aluminum-containing material with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid;

heating the precipitate under conditions effective for converting $AlCl_3$ into $Al_2O_3$ and recovering gaseous HCl so-produced; and recycling the gaseous HCl so-produced by contacting it with the leachate so as to precipitate the aluminum ions in the form of $AlCl_3.6H_2O$.

BRIEF DESCRIPTION OF DRAWINGS

In the following drawings, which represent by way of example only, various embodiments of the disclosure.

DETAILED DESCRIPTION OF VARIOUS EMBODIMENTS

Figure 1:
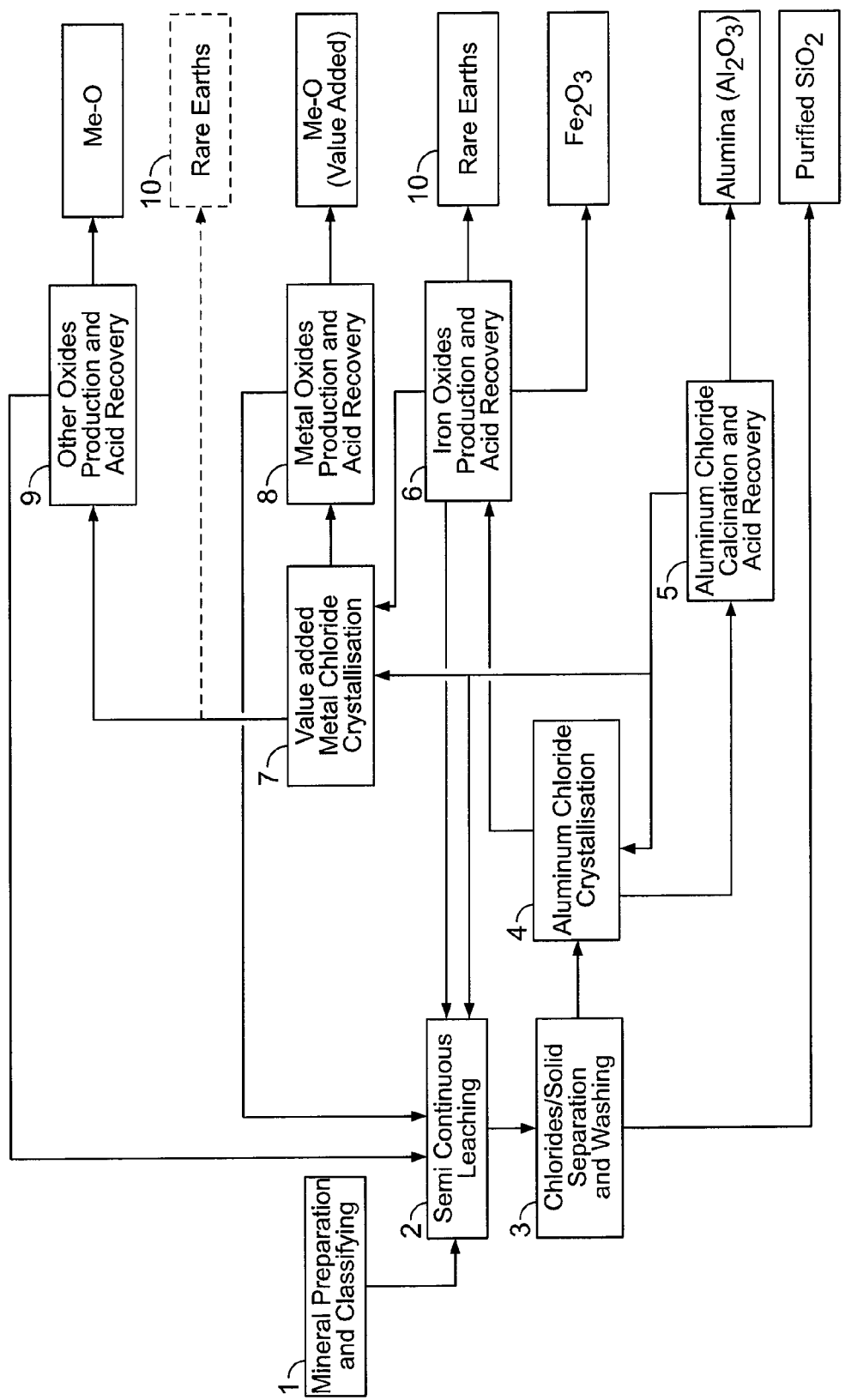
FIG. 1 shows a bloc diagram of an example of a process for preparing alumina and various other products including rare earth elements, according to the present disclosure.

Further features and advantages will become more readily apparent from the following description of various embodiments as illustrated by way of examples.

It was found that that the rare earth element(s) recovery can be made, for example, in the processes described in the present disclosure at various stages. Moreover, it was found that such processes can be useful even if the rare earth elements are only found as traces. It was also found that such processes can be particularly useful for extracting rare earth elements from a solution that is substantially refined or purified. For example, these processes can be useful since they can be applied to solutions from which several of the main components have been removed (for example precipitated) for example iron ions and aluminum ions. They can also be applied to solutions before removal of several of the main components.

The expression "at least one aluminum ion", as used herein refers, for example, to at least one type of aluminum ion chosen from all possible forms of Al ions. For example, the at least one aluminum ion can be $Al^{3+}$.

The expression "at least one iron ion", as used herein refers, for example, to at least one type of iron ion chosen from all possible forms of Fe ions. For example, the at least one iron ion can be $Fe^{2+}$, $Fe^{3+}$, or a mixture thereof.

The expression "at least one rare earth element", as used herein refers, for example, to at least one type of rare earth element chosen from all the rare earth elements described in the present disclosure in all their possible forms.

The expression "Ga-free solution", as used herein refers, for example, to a solution that comprises about less than 5%, 2% or 1% w/v of gallium.

The expression "Ce-free solution", as used herein refers, for example, to a solution that comprises about less than 5%, 2% or 1% w/v of cerium.

The expression "Sc-free solution", as used herein refers, for example, to a solution that comprises about less than 5%, 2% or 1% w/v of scandium.

The expression "Sm-free solution", as used herein refers, for example, to a solution that comprises about less than 5%, 2% or 1% w/v of samarium.

The expression "Eu-free solution", as used herein refers, for example, to a solution that comprises about less than 5%, 2% or 1% w/v of europium.

The expression "Gd-free solution", as used herein refers, for example, to a solution that comprises about less than 5%, 2% or 1% w/v of gadolinium.

The expression "Y-free solution", as used herein refers, for example, to a solution that comprises about less than 5%, 2% or 1% w/v of yttrium.

The expression "Pr-free solution", as used herein refers, for example, to a solution that comprises about less than 5%, 2% or 1% w/v of praseodymium.

The expression "Nd-free solution", as used herein refers, for example, to a solution that comprises about less than 5%, 2% or 1% w/v of neodymium.

The expression "La-free solution", as used herein refers, for example, to a solution that comprises about less than 5%, 2% or 1% w/v of lanthanum.

The expression "Er-free solution", as used herein refers, for example, to a solution that comprises about less than 5%, 2% or 1% w/v of erbium.

The expression "Dy-free solution", as used herein refers, for example, to a solution that comprises about less than 5%, 2% or 1% w/v of dysprosium.

The expression "rare earth element" as used herein refers, for example, to a rare element chosen from scandium, yttrium, lanthanum, cerium, praseodymium, neodymium, promethium, samarium, europium, gadolinium, terbium, dysprosium, holmium, erbium, thulium, ytterbium, and lutetium, and/or a rare metal chosen from indium, zirconium, lithium, and gallium. These rare earth elements and rare metals can be in various form such as the elemental form (or metallic form), under the form of chlorides, oxides, hydroxides etc.

The expression "the at least one rare earth element" as used herein refers, for example, to a at least one rare element chosen from scandium, yttrium, lanthanum, cerium, praseodymium, neodymium, promethium, samarium, europium, gadolinium, terbium, dysprosium, holmium, erbium, thulium, ytterbium, and lutetium, and/or to at least one rare metal chosen from indium, zirconium, lithium, and gallium. These rare earth elements and rare metals can be in various form such as the elemental form (or metallic form), or under the form of chlorides, oxides, hydroxides etc.

In the processes of the present disclosure, after the leaching, the substantially selectively removing of the at least one member chosen from the at least one rare earth element, the at least one iron ion and the at least one aluminum ion from the leachate can be made in various manners. The at least one iron ion can be removed and then, the at least one aluminum ion can be removed and finally, the at least one rare earth element can be removed. Alternatively, the at least one aluminum ion can be removed, then the at least one iron ion can be removed and finally, the at least one rare earth element can be removed. According to another example, the at least one rare earth element can be removed, then, the at least one aluminum ion can be removed, and finally the at least one iron ion can be removed. Also, the at least one rare earth element can be removed, then, the at least one iron ion can be removed, and finally the at least one aluminum ion can be removed. Various other possible combinations can also be envisaged.

The acid used for leaching aluminum-bearing material can be HCl, $H_2SO_4$, $HNO_3$ or mixtures thereof. More than one acid can be used as a mixture or separately. Solutions made with these acids can be used at various concentration. For example, concentrated solutions can be used. For example, 6 M or 12 M HCl can be used. For example, up to 98% or 100% wt $H_2SO_4$ can be used.

For example, the aluminum-bearing material can be leached with HCl having a concentration of about 15 to about 45 weight %, of about 20 to about 45 weight %, of about 25 to about 45 weight %, of about 26 to about 42 weight %, of about 28 to about 40 weight %, of about 30 to about 38 weight %, or between 25 and 36 weight %.

For example, the aluminum-bearing material can be leached at a temperature of about 125 to about 225° C., about 150 to about 200° C., about 160 to about 180° C., or about 165 to about 170° C.

For example, the leaching can be carried out under pressure. For example, the pressure can be about 100 to about 300 or about 150 to about 200 psig. The leaching can be carried out for about 30 minutes to about 5 hours. For example, the leaching can be carried out at a temperature of about 60° C. to about 200° C.

For example, the leaching can be carried out under pressure into an autoclave. For example, it can be carried out at a pressure of 5 KPag to about 850 KPag, 50 KPag to about 800 KPag, 100 KPag to about 750 KPag, 150 KPag to about 700 KPag, 200 KPag to about 600 KPag, or 250 KPag to about 500 KPag.

For example, the leaching can be carried out at a temperature of at least 80° C., at least 90° C., or about 100° C. to about 110° C. In certain cases it can be done at higher temperatures so as to increase extraction yields of rare earth elements in certain ores. For example, the leaching can be carried out at a temperature of at least 100° C., at least 120° C., at least 130° C., at least 140° C., or about 140° C. to about 175° C.

For example, in the leachate, the at least one rare earth element can be in the form of an ion.

For example, after the leaching, the at least one rare earth element can be solubilized into the solution and can be found as a soluble ion, associated to chlorine, a sulfate, a nitrate, or hydrates thereof. etc.

For example, after the leaching, (if required) various bases can be used for raising up the pH such as KOH, NaOH, $Ca(OH)_2$, CaO, MgO, $Mg(OH)_2$, $CaCO_3$, $Na_2CO_3$, $NaHCO_3$, $CO_2$, or mixtures thereof.

For example, the at least one iron ion can be precipitated. When precipitating the at least one iron ion, it can be precipitated by means of an ionic precipitation and it can precipitate in the form of various salts, hydroxides, chlorides or hydrates thereof. For example, the at least one iron ion can be precipitated as $FeCl_2$, $FeCl_3$, $Fe(OH)_3$, $Fe(OH)_2$, hematite, geotite, jarosite or hydrates thereof.

For example, after the precipitation of the at least one iron ion, the at least one rare earth element can be solubilized into the solution and can be found as a soluble ion, associated as an hydroxide or a salt, or hydrates thereof.

For example, the at least aluminum ion can be precipitated. When precipitating the at least aluminum ion, it can be precipitated by means of an ionic precipitation and it can precipitate in the form of various salts, (such as chlorides, sulfates) or hydroxides or hydrates thereof. For example, the at least one aluminum ion can be precipitated as $Al(OH)_3$, $AlCl_3$, $Al_2(SO_4)_3$, or hydrates thereof.

For example, after the precipitation of the at least one aluminum ion, the at least one rare earth element can be solubilized into the solution and can be found as a an ion associated to an hydroxide or a salt or hydrates thereof.

For example, after precipitation of the at least one of iron ion and precipitation of the at least one aluminum ion precipitation, the residual and substantially purified or refined solution can contain the at least one rare earth element into a mixture of residual solubles ions, such as $Cl^-$, $SO_4^{2-}$, $Na^+$.

The processes of the present disclosure can be effective for treating various aluminum-bearing materials. The aluminum-bearing material can be an aluminum-bearing ore. For example, clays, argillite, mudstone, beryl, cryolite, garnet, spinel, bauxite, or mixtures thereof can be used as starting material. The aluminum-bearing material can also be a recycled industrial aluminum-bearing material such as slag. The aluminum-bearing material can also be red mud.

For example, the at least one rare earth element can be chosen from scandium, yttrium, lanthanum, cerium, praseodymium, neodymium, promethium, samarium, europium, gadolinium, terbium, dysprosium, holmium, erbium, thulium, ytterbium, and lutetium, and from at least one rare metal chosen from indium, zirconium, lithium, and gallium.

For example, rare earth elements can sometimes be divided into two categories, light rare earth elements (LRE) and heavy rare earth elements (HRE). The light rare earth elements can comprise lanthanum, cerium, praseodymium, neodymium, and samarium (atomic numbers 57-62), and they are usually more abundant than heavy ones.

For example, the at least one rare element can be extracted under the form of various salts, oxides, hydroxides, and hydrates thereof.

For example, the at least one rare earth element can be chosen from scandium, gallium, yttrium, lanthanum, cerium, praseodymium, neodymium, promethium, samarium, europium, gadolinium, dysprosium, erbium, ytterbium and mixtures thereof.

For example, the at least one rare earth element is chosen from scandium, gallium, yttrium, lanthanum, cerium, praseodymium, neodymium, promethium, samarium, europium, gadolinium, dysprosium and mixtures thereof.

For example, the at least one rare earth element is chosen from scandium, gallium, yttrium, cerium and mixtures thereof.

For example, the at least one rare earth element can be yttrium.

For example, the at least one rare earth element can be scandium.

For example, the at least one rare earth element can be gallium.

For example, the at least one rare earth element can be cerium.

For example, the processes can comprise:

leaching the aluminum-bearing material with HCl so as to obtain the leachate comprising the at least one aluminum ion, the at least one iron ion, and the at least one rare earth element, and the solid and separating the leachate from the solid;

substantially selectively removing the at least one aluminum ion from the leachate, thereby obtaining a composition comprising the at least one iron ion, and the at least one rare earth element; and substantially selectively at least partially removing the at least one iron ion from the composition, thereby obtaining a liquor comprising the at least one rare earth element.

For example, the at least one aluminum ion can be substantially selectively removed from the leachate by substantially selectively precipitating it from the leachate and removing it therefrom by carrying out a solid-liquid separation.

For example, the at least one aluminum ion can be substantially selectively removed from the leachate by substantially selectively precipitating it under the form of $AlCl_3$ and removing it therefrom by carrying out a solid-liquid separation.

For example, the composition can comprise HCl, the at least one iron ion, and the at least one rare earth element.

For example, the composition can be an acidic composition that comprises, the at least one iron ion, and the at least one rare earth element.

For example, the at least one iron ion can be substantially selectively removed from the composition by carrying out an hydrolysis so as to convert the at least one iron ion into $Fe_2O_3$ and removing the precipitated $Fe_2O_3$ from the composition by carrying out a solid-liquid separation, thereby obtaining the liquor comprising the at least one rare earth element.

For example, after the removal of the precipitated $Fe_2O_3$, the liquor containing the at least one rare earth element is recirculated back for being further concentrated by being used in precipitating the at least one aluminum.

For example, after the removal of the precipitated $Fe_2O_3$, the liquor containing the at least one rare earth element is recirculated back for being further concentrated by being used in precipitating the at least one aluminum ion under the form of $AlCl_3$.

For example, the at least one iron ion can be $Fe^{3+}$ and it can be substantially selectively partially removed from the composition, and wherein the composition can be further treated with a reducing agent so as to convert $Fe^{3+}$ into $Fe^{2+}$ and then, $Fe^{2+}$, under the form of $FeCl_2$, can be removed from the composition by carrying out a solid-liquid separation, thereby obtaining the liquor comprising the at least one rare earth element.

For example, the at least one rare earth element can be substantially selectively precipitated, extracted and/or isolated from the liquor by means of a liquid-liquid extraction.

For example, the at least one rare earth element can be extracted from the liquor by means of liquid-liquid extraction.

For example, the at least one rare earth element can be recovered from the liquor by means of liquid-liquid extraction.

For example, the at least one extracting agent can be chosen from di-(2-ethylhexyl)phosphoric acid (HDEHP), mono(2-ethylhexyl)2-ethylhexyl phosphonate (HEH/EHP), bis(2,4,4-trimethylpentyl)monothiophosphinic acid), octyl phenyl phosphate (OPAP), 2-ethylhexylphosphonic acid mono-2-ethylhexyl ester (PC88A) and optionally toluene, tributyl phosphate, di-isoamylmethyl phosphonate, 7-(4-ethyl-1-methyloctyl)-8-hydroxyquinoline, di-(2-ethylhexyl)phosphinic acid, bis(2,4,4-trimethylpentyl)phosphinic acid, 8-hydroxyquinoline, and (2-ethylhexyl)phosphonic acid, and mixtures thereof.

For example, the at least one extracting agent can be di-(2-ethylhexyl)phosphoric acid.

For example, the at least one extracting agent can be 2-ethylhexylphosphonic acid mono-2-ethylhexyl ester.

For example, the at least one extracting agent can be octyl phenyl phosphate.

For example, the at least one extracting agent can be tributyl phosphate.

For example, the at least one extracting agent can be chosen from diethylenetriamine-penthaacetic acid (DTPA), ethylenediaminetetraacetic (EDTA), 1,4,7,10-tetraazacyclododecane-1,4,7,10-tetraacetic acid (DOTA), bis(2,4,4-trimethylpentyl)monothiophosphinic acid and mixtures thereof.

According to one example, when substantially selectively precipitating, extracting and/or isolating the at least one rare earth element from the leachate and/or the precipitate, the at least one rare earth element found as an ion in the leachate can be precipitated.

For example, scandium can be precipitated in the form of $Sc(OH)_3$, $ScCl_3$, $ScF_3$, and/or $[ScF_6]^{3-}$(cation), wherein the cation can be sodium, potassium, magnesium, calcium etc Scandium can be precipitated at a pH of about 7 to about 9, or about 7 to about 8.

For example, the leaching can be carried out at a pH of about 0.5 to about 2.5., about 0.5 to about 1.5, or about 1; then iron can be precipitated at a pH of at least about 9.5, 10, 10.5, 11, or 11.5; and then aluminum can be precipitated at a pH of about 8 to about 9.

For example, the at least one iron ion can be precipitated at a pH of about 10 to about 12.5, 10.5 to about 11.5, about 10.8 to about 11.2, about 11.5 to about 12.5, or between 10 and 11.

For example, the precipitation of the at least one aluminum ion can be carried out at a pH of about 7 to about 11, about 8 to about 10.5, about 8.5 to 10 or about 9 to about 10.

For example, the precipitation of the at least one iron ion can be carried out at a pH of about 3 to about 6, about 3.0 to about 5.5, about 3 to about 5, about 3 to about 4, about 3.0 to about 3.5, about 3.5 to about 4.0, about 4.0 to about 5.0, about 4.0 to about 4.5, or about 4.5 to about 5.0.

For example, the precipitation of the at least one aluminum ion can be carried out at a pH of about 5 to about 6, about 5.0 to about 5.5, or about 5.5 to about 6.0.

For example, when precipitating $AlCl_3$, highly concentrated dry gaseous HCl at about 90 to about 98% can be bubbled into the composition comprising the at least one iron ion, the at least one aluminum ion and the at least one rare earth element.

For example, when carrying out the hydrolysis of the at least one iron ion so as to convert the at least one iron ion into $Fe_2O_3$ and removing the $Fe_2O_3$, the pH during the hydrolysis can be about below 2.5, 2.0, 1.5 or 1.0.

According to another example, the liquor can comprise the at least one rare earth element under the form of a chloride, and wherein the liquor can be reacted with an extracting agent in order to substantially selectively extract gallium therefrom, thereby obtaining a Ga-free solution and an extracted gallium solution, and separating the solutions from one another. For example, gallium in the liquor can be under the form of $GaCl_3$. For example, the extracting agent can be octyl phenyl phosphate, 2-ethylhexylphosphonic acid mono-2-ethylhexyl ester and toluene, tri-butyl phosphate or mixtures thereof. For example, the extracted $GaCl_3$ can then be precipitated and then converted into $Ga_2O_3$.

For example, the Ga-free solution can then be reacted with another an extracting agent in order to substantially selectively extract cerium therefrom, thereby obtaining a Ce-free solution and an extracted cerium solution, and separating the solutions from one another. For example, the cerium in the Ga-free solution can be under the form of $CeCl_3$. For example, the another extracting agent can be tri-butyl phosphate, di-isoamylmethyl phosphonate, di-(2-ethylhexyl) phosphoric acid, 7-(4-ethyl-1-methyloctyl)-8-hydroxyquinoline or mixtures thereof. For example, the process can further comprise converting the extracted cerium into $CeO_2$.

For example, the process can further comprise reacting the Ce-free solution with a further extracting agent in order to substantially selectively extract scandium therefrom, thereby obtaining a Sc-free solution and an extracted scandium solution, and separating the solutions from one another. For example, scandium in the Ce-free solution can be under the form of $ScCl_3$. For example, the further extracting agent can be di-(2-ethylhexyl)phosphoric acid, di-(2-ethylhexyl)phosphinic acid or a mixture thereof. For example, the process can further comprise converting the extracted scandium into $Sc_2O_3$. For example the extracted scandium can be converted into $Sc_2O_3$ by means of NaOH.

For example, the process can further comprise reacting the Sc-free solution with still a further extracting agent in order to substantially selectively extract samarium, europium or a mixture thereof, thereby obtaining a Sm-free solution and/or Eu-free solution and extracted samarium and/or europium solution, and separating the solutions from one another. For example, the still a further extracting agent can be chosen from bis(2,4,4-trimethylpentyl)phosphinic acid, di-(2-ethylhexyl)phosphoric acid and a mixture thereof.

For example, the process can further comprise reacting the Sm-free solution and/or Eu-free solution with still another extracting agent in order to substantially selectively extract gadolinium, thereby obtaining a Gd-free solution and an extracted gadolinium solution, and separating the solutions from one another. For example, the still another extracting agent can be 8-hydroxyquinoline.

For example, the process can further comprise reacting the Gd-free solution with yet another extracting agent in order to substantially selectively extract yttrium, thereby obtaining a Y-free solution and an extracted yttrium solution, and separating the solutions from one another. For example, the yet another extracting agent can be (2-ethylhexyl)phosphonic acid, di-(2-ethylhexyl)phosphonic acid or a mixture thereof.

For example, the process can further comprise reacting the Y-free solution with still yet another extracting agent in order to substantially selectively extract dysprosium and/or erbium, thereby obtaining a Dy-free solution and/or an Er-free solution and an extracted dysprosium and/or erbium solution, and separating the solutions from one another.

According to another example, the liquor can be reacted with a first extracting agent in order to substantially selectively extract gallium therefrom, thereby obtaining a Ga-free solution and an extracted gallium solution, and separating the solutions from one another.

For example, gallium in the liquor can be under the form of $GaCl_3$. For example, the first extracting agent can be tri-butyl phosphate optionally in kerosene.

For example, the Ga-free solution can be reacted with a precipitating agent for precipitating at least one rare earth element present in the Ga-free solution, thereby obtaining a precipitate containing the at least one rare earth element and recovering the precipitate via a solid-liquid separation.

For example, the process can further comprise leaching the precipitate with an acid so as to obtain a leach solution comprising the at least one rare earth element. For example the acid can be HCl. For example, the leach solution can be reacted with a second extracting agent so as to substantially selectively extract a first group of rare earth elements, thereby obtaining a solution comprising the extracted rare earth elements of the first group and a raffinate comprising a second group of rare earth elements, and separating the solution from the raffinate. For example, the first group can comprise yttrium and scandium. For example, the second group can comprise cerium, neodynium, europium and praseodymium. For example, the second extracting agent can be chosen from di-(2-ethylhexyl)phosphoric acid and 2-ethylhexylphosphonic acid mono-2-ethylhexyl ester.

For example, the process can further comprise reacting the solution comprising the extracted rare earth elements of the first group with HCl at least once so as to remove impurities therefrom.

For example, the process can further comprise stripping the solution comprising the extracted rare earth elements of the first group with an acid so as to obtain a first group strip liquor. For example, the acid can be HCl.

For example, the process can further comprise repeating at least once the extraction with the second extracting agent.

For example, the first group strip liquor can be reacted with a third extracting agent so as to substantially selectively extracting at least one of scandium, erbium and dysprosium from the first group strip liquor, thereby obtaining a solution comprising the extracted at least one of scandium, erbium and dysprosium, and an yttrium raffinate, and separating the solution from the raffinate. For example, the third extracting agent can be tri-butyl phosphate.

For example, the process can further comprise stripping the solution comprising the extracted at least one of scandium, erbium and dysprosium solution with an acid so as to obtain another first group strip liquor. For example, the acid can be HCl.

For example, the another first group strip liquor can be reacted with a fourth extracting agent so as to substantially selectively extracting erbium and dysprosium from the another first group strip liquor, thereby obtaining a solution comprising the extracted erbium and dysprosium, and a scandium raffinate, and separating the solution from the raffinate.

For example, the another first group strip liquor can be reacted with a fourth extracting agent so as to substantially selectively extracting scandium from the another first group strip liquor, thereby obtaining a solution comprising the extracted scandium, and raffinate comprising erbium and dysprosium, and separating the solution from the raffinate.

For example, the at least one rare earth element can be substantially selectively precipitated, extracted and/or isolated by means of an adsorption on activated charcoal optionally modified with tributyl phosphate or on a polyurethane polyether foam (PUF).

For example, the at least one rare earth element can be substantially selectively removed by means of a liquid-liquid extraction. For example, the liquid-liquid extraction can be carried out by using an extracting agent.

For example, the process can comprise selectively precipitating at least two members chosen from the at least one rare earth element that is in the form of ions, the at least one iron ion and the at least one iron ion aluminum ion. For example, each of the members can be precipitated separately or together.

According to another example, the processes can comprise:
- leaching the aluminum-bearing material with HCl so as to obtain the leachate comprising the at least one aluminum ion, the at least one iron ion, and the at least one rare earth element, and the solid and separating the leachate from the solid;
- substantially selectively removing the at least one iron ion from the leachate, thereby obtaining a composition comprising the at least one aluminum ion, and the at least one rare earth element; and
- substantially selectively at least partially removing the at least one aluminum ion from the composition, thereby obtaining a liquor comprising the at least one rare earth element.

According to another example, the processes can comprise:
- leaching the aluminum-bearing material with HCl so as to obtain the leachate comprising the at least one aluminum ion, the at least one iron ion, and the at least one rare earth element, and the solid and separating the leachate from the solid;
- substantially selectively removing the at least one iron ion from the leachate, thereby obtaining a composition comprising the at least one aluminum ion, and the at least one rare earth element; and
- substantially selectively at least partially removing the at least one aluminum ion from the composition, thereby obtaining a liquor comprising the at least one rare earth element.

According to another example, the leaching can be carried out at a pH of about 0.5 to about 2.5., then the at least one iron can be precipitated at a pH of at least about 9.5, then the at least one aluminum ion can be precipitated at a pH of about 8 to about 9, and then at least one scandium ion can be precipitated at a pH of about 7 to about 8.

According to another example, the leaching can be carried out at a pH of about 0.5 to about 1.5., then the at least one iron can be precipitated at a pH of at least about 10.5, then the at least one aluminum ion can be precipitated at a pH of about 8 to about 9, and then at least one scandium ion can be precipitated at a pH of about 7 to about 8.

According to another example, the leaching can be carried out at a pH of about 0.5 to about 1.5., then the at least one iron can be precipitated at a pH of at least about 11, then the at least one aluminum ion can be precipitated at a pH of about 8 to about 9, and then at least one scandium ion can be precipitated at a pH of about 7 to about 8.

For example, scandium can be precipitated from a by-product generated during the process.

For example, scandium can be precipitated from a solution generated during the process. For example, scandium can be precipitated using $HNO_3$.

For example, the at least one rare earth element can be substantially selectively precipitated, extracted and/or isolated by at least one technique chosen from ion exchange resin, extraction by means of solvent(s) and adsorption.

For example, the at least one rare earth element can be substantially selectively precipitated, extracted and/or isolated by means of an ion exchange resin.

For example, the at least one rare earth element can be substantially selectively precipitated, extracted and/or isolated by means of a liquid-liquid extraction.

For example, the at least one rare earth element can be substantially selectively precipitated, extracted and/or isolated by means of an electrowinning process.

According to another example, the leaching can be carried out at a pH of about 0.5 to about 2.5., then the at least one iron can be precipitated at a pH of at least about 9.5, then the at least one aluminum ion can be precipitated at a pH of about 8 to about 9, and then and then the at least one rare earth element can be substantially selectively extracted.

According to another example, the leaching can be carried out at a pH of about 0.5 to about 1.5., then the at least one iron can be precipitated at a pH of at least about 10.5, then the at least one aluminum ion can be precipitated at a pH of about 8 to about 9, and then the at least one rare earth element can be substantially selectively extracted.

According to another example, the leaching can be carried out at a pH of about 0.5 to about 1.5., then the at least one iron can be precipitated at a pH of at least about 11, then the at least one aluminum ion can be precipitated at a pH of about 8 to about 9, and then the at least one rare earth element can be substantially selectively extracted.

For example, the aluminum-bearing material/acid ratio can be about 1/10 in weight by volume.

According to another example, the processes can further comprise at least one of
- at least partially removing the at least one iron ion from the leachate by substantially complexing the at least one iron ion with an extracting agent;
- selectively precipitating the at least one iron ion;
- selectively precipitating the at least one aluminum ion; and
- at least partially removing the at least one aluminum ion from the leachate by substantially complexing the at least one aluminum ion with another extracting agent.

According to another example, the processes comprise:
- leaching the aluminum-bearing material with HCl so as to obtain a leachate and a solid residue, and separating the leachate from the solid residue;
- at least partially removing the at least one iron ion from the leachate by substantially selectively precipitating the at least one iron ion by reacting the leachate with a base so as to obtain an Al-rich aqueous composition comprising the at least one rare element and a precipitate, and removing the precipitate from the composition;
- purifying the Al-rich aqueous composition by substantially selectively precipitating the at least one aluminum ion, thereby obtaining another composition comprising the at least one rare element and another precipitate, removing the precipitate from the composition; and
- substantially selectively extracting the at least one rare element from the another composition.

According to another example, the processes can comprise:
- leaching the aluminum-bearing material with HCl so as to obtain a leachate and a solid residue, and separating the leachate from the solid residue,
- at least partially removing the at least one iron ion from the leachate by substantially selectively precipitating the at least one iron ion by reacting the leachate with a base so as to obtain an Al-rich aqueous composition comprising the at least one rare element and a precipitate, and removing the precipitate from the composition;
- substantially selectively extracting the at least one aluminum ion from the Al-rich aqueous composition by means of a hollow fiber membrane, or by a liquid-liquid extraction, and removing the extracted at least one aluminum ion, thereby obtaining an Al-depleted aqueous composition comprising the at least one rare element; and
- substantially selectively extracting the at least one rare element from the Al-depleted aqueous composition.

According to another example, the processes can comprise:
- leaching the aluminum-bearing material with HCl so as to obtain a leachate and a solid residue, and separating the leachate from the solid residue;
- at least partially removing the at least one iron ion from the leachate by substantially selectively complexing the at least one iron ion with an extracting agent so as to obtain an Al-rich aqueous composition comprising the at least one rare earth element;
- purifying the Al-rich aqueous composition by substantially selectively precipitating the at least one aluminum ion, thereby obtaining another composition comprising the at least one rare element and another precipitate, removing the precipitate from the composition; and
- substantially selectively extracting the at least one rare element from the another composition.

According to another example, the processes can comprise:
- leaching the aluminum-bearing material with HCl so as to obtain a leachate and a solid residue, and separating the leachate from the solid residue;
- at least partially removing the at least one iron ion from the leachate by substantially selectively complexing the at least one iron ion with an extracting agent so as to obtain an Al-rich aqueous composition comprising the at least one rare earth element;
- substantially selectively extracting the at least one aluminum ion from the Al-rich aqueous composition by means of a hollow fiber membrane, or by a liquid-liquid extraction, and removing the extracted at least one aluminum ion, thereby obtaining an Al-depleted aqueous composition comprising the at least one rare element; and
- substantially selectively extracting the at least one rare element from the Al-depleted aqueous composition.

According to another example, the processes can comprise:
- leaching the aluminum-bearing material with HCl so as to obtain a leachate and a solid residue, and separating the leachate from the solid residue;
- at least partially removing the at least one aluminum ion from the leachate by substantially selectively precipitating the at least one aluminum so as to obtain an iron-rich aqueous composition comprising the at least one rare element and a precipitate, and removing the precipitate from the composition;
- substantially selectively precipitating the at least one iron ion from the iron-rich aqueous composition, and removing the precipitate therefrom, thereby obtaining thereby obtaining an iron-depleted aqueous composition comprising the at least one rare element; and
- substantially selectively extracting the at least one rare element from the iron-depleted aqueous composition.

For example, the at least one aluminum ion can be precipitated under the form of $AlCl_3$ in a crystallizer, for example, by sparging gaseous HCl.

For example, the at least one iron ion can be precipitated under the form of $Fe_2O_3$ by means, for example, of an hydrolysis.

For example, the Al-rich aqueous composition can be purified by complexing the at least one aluminum ion with an extracting agent so as to obtain a complex, separating the complex form the composition and precipitating the at least one aluminum ion.

For example, the Al-rich aqueous composition can be purified by complexing impurities contained in the Al-rich aqueous composition with an extracting agent, at least partially removing the complexed impurities from the composition and precipitating the aluminum ions.

According to another example the processes can comprise:
1—leaching argillite with an acid (for example a solution of HCl or gaseous HCl (for example at pH of about 0.5 to about 1.5 or about 0.8 to about 1.2). The leaching cal also be carried out under pressure;
2—removing iron by ionic precipitation by raising th at pH of about 10 to about 12 or about 11 to about 12 (or extracting it with extracting agents) and filtering out all non-soluble hydroxides;
3—precipitating aluminum at a pH of about 7.5 to about 9.0 or about 7.8 to about 8.2 and and filtering aluminium hydroxide as a solid;
4—optionally purifying aluminum ($Al(OH)_3$) using at least one of a liquid-liquid extraction, a membrane and an extracting agent suitable for complexing aluminum ions; and
5—precipitating, extracting and/or isolating at least one rare earth element can be carried out after at least one of steps 1, 2, 3 and 4.

For more details and explanations regarding at least certain portions of steps 1 to 4, WO2008141423, which is hereby incorporated by reference in its entirety, can be referred to.

According to another example the processes can comprise:
1—leaching argillite with an acid (for example a solution of HCl 18-32 wt %. The leaching can also be carried out under pressure such as about 350 KPag to about 500 KPag during about 4 to about 7 hours;
2—removing iron by ionic precipitation by raising the at pH of about 10 to about 12 or about 11 to about 12 (or extracting it with extracting agents) and filtering out all non-soluble hydroxides;
3—precipitating aluminum at a pH of about 7.5 to about 9.0 or about 7.8 to about 8.2 and and filtering aluminium hydroxide as a solid;
4-optionally purifying aluminum ($Al(OH)_3$) using at least one of a liquid-liquid extraction, a membrane and an extracting agent suitable for complexing aluminum ions; and
5—precipitating, extracting and/or isolating at least one rare earth element can be carried out after at least one of steps 1, 2, 3 and 4.

According to another example as shown in FIG. 1, the processes can involve the following steps (the reference numbers in FIG. 1 correspond to the following steps):
1—The aluminum-bearing material is reduced to an average particle size of about 50 to about 80 μm.
2—The reduced and classified material is treated with hydrochloric acid which allows for dissolving, under a predetermined temperature and pressure, the aluminum with other elements like iron, magnesium and other metals including rare earth. The silica remains totally undissolved.
3—The mother liquor from the leaching step then undergoes a separation, a cleaning stage in order to separate the purified silica from the metal chloride in solution.
4—The spent acid (leachate) obtained from step 1 is then brought up in concentration with dry and highly concentrated gaseous hydrogen chloride by sparging this one into a crystallizer. This results into the crystallization of aluminum chloride hexahydrate (precipitate) with a minimum of other impurities. Depending on the concentration of iron chloride at this stage, further crystallization step(s) can be required. The precipitate is then separated from the liquid.

5—The aluminum chloride hexahydrate is then calcined (for example by means of a rotary kiln, fluid bed, etc) at high temperature in order to obtain the desired alumina. Highly concentrated gaseous hydrogen chloride is then recovered and excess is brought in aqueous form to the highest concentration possible so as to be used (recycled) in the acid leaching step.

6—Iron chloride (the liquid obtained from step 4) is then pre-concentrated and hydrolyzed at low temperature in view of the $Fe_2O_3$ (hematite form) extraction and acid recovery from its hydrolysis. All heat recovery from the calcination step (step 5), the leaching part exothermic reaction (step 1) and other section of the process is being recovered into the pre-concentrator.

10—After the removal of hematite, a solution rich in rare earth elemants can be processed by using any one of the processes described in the present disclosure for recovering rare earth elements from aluminum-bearing materials. For example, the recovered rare earth elements can be in various forms such oxides, chlorides, hydroxides etc. As previously indicated in the present disclosure, the expression "rare earth element" can also encompass "rare metal" and thus, in step 10, rare metals can also be recovered. For example, rare metals can be under the form of rare metals oxides. Thus, in FIGS. 1 and 2, the step 10 can be, for example, the processes shown in FIG. 3 or in FIGS. 4a and 4b.

Other non-hydrolyzable metal chlorides (Me-Cl) such as $MgCl_2$ and others then undergo the following steps:

7—The solution rich in magnesium chloride and other non-hydrolyzable products at low temperature is then brought up in concentration with dry and highly concentrated gaseous hydrogen chloride by sparging it into a crystallizer. This results into the precipitation of magnesium chloride as an hexahydrate.

8—Magnesium chloride hexahydrate is then calcined (either through a rotary kiln, fluid bed, etc.) and hydrochloric acid at very high concentration is thus regenerated and brought back to the leaching step.

9—Other Me-Cl undergo a standard pyrohydrolysis step where mixed oxides can be produced and hydrochloric acid at the azeotropic point (20.2% wt.) is regenerated.

For example, the liquid can be concentrated to a concentrated liquid having an iron chloride concentration of at least 30% by weight; and then the iron chloride can be hydrolyzed at a temperature of about 155 to about 350° C. while maintaining a ferric chloride concentration at a level of at least 65% by weight, to generate a composition comprising a liquid and precipitated hematite, and recovering the hematite.

For example, the liquid can be concentrated to a concentrated liquid having an iron chloride concentration of at least 30% by weight; and then the iron chloride can be hydrolyzed at a temperature of about 155 to about 350° C. while maintaining a ferric chloride concentration at a level of at least 65% by weight, to generate a composition comprising a liquid and precipitated hematite; recovering the hematite; and recovering rare earths from the liquid. For example, the process can further comprise, after recovery of the rare earths, reacting the liquid with HCl so as to cause precipitation of $MgCl_2$, and recovering same.

As previously indicated, various aluminum-bearing materials can be used as starting material of the processes disclosed in the present disclosure. Examples with clays and bauxite have been carried out. However, the person skilled in the art will understand that the continuous processes can handle high percentages of silica (>55%) and impurities as well as relatively low percentages of aluminum (for example as low as about 15%) and still being economically and technically viable. Satisfactory yields can be obtained (>93-95%) on $Al_2O_3$ and greater than 75% on rare earth elements. No pre-thermal treatment in most cases are required. The processes disclosed in the present disclosure involve special techniques on leaching and acid recovery at very high strength, thereby offering several advantages over alkaline processes.

In step 1 the mineral, whether or not thermally treated is crushed, milled, dried and classified to have an average particle size of about 50 to about 80 μm.

In step 2, the milled raw material is introduced into the reactor and will undergo the leaching phase.

The leaching hydrochloric acid used in step 2 is a recycled or regenerated acid from steps 5, 6, 8 and 9 and its concentration can vary from 15% to 45% weight. percent. Higher concentration can be obtained using a membrane separation, a cryogenic and/or high pressure approach. The acid leaching can be carried out under pressure and at temperature close to its boiling point thus, allowing a minimal digestion time and extended reaction extent (90%-100%). Leaching (step 2) can be accomplished in a semi-continuous mode where spent acid with residual free hydrochloric acid is replaced by highly concentrated acid at a certain stage of the reaction or allowing a reduced acid/mineral ratio, thereby reducing reaction time and improving reaction kinetics. For example, kinetic constant k can be: 0.5-0.75 g/mole·L As previously indicated, alkali metals, iron, magnesium, calcium, potassium, rare earth elements and other elements will also be in a chloride form at different stages. Silica will remain undissolved and will undergo (step 3) a liquid/solid separation and cleaning stage. The processes of the present disclosure tend to recover maximum amount of free hydrochloric acid left and chlorides in solution in order to maximize hydrochloric acid recovery yield, using techniques such as rake classifying, filtration with band filters, centrifugation, and others. Mother liquor free of silica is then named as spent acid (various metal chlorides and water) and goes to the crystallization step (step 4).

In step 4, the spent acid (or leachate) with a substantial amount of aluminum chloride is then saturated with dry and highly concentrated gaseous hydrogen chloride obtained or recycled from step 5, which results in the precipitate of aluminum chloride hexahydrate ($AlCl_3.6H_2O$). The precipitate retained is then washed and filtered or centrifuged before being fed to the calcination stage (step 5). The remaining of the spent acid from step 4 is then processed to acid recovery system (steps 6 to 8) where pure secondary products will be obtained.

In step 5, aluminum oxide (alumina) is directly obtained from high temperature conditions. The highly concentrated hydrogen chloride in gaseous form obtained can be fed to steps 4 and 7 for crystallization. The excess hydrogen chloride is absorbed and used as regenerated acid to the leaching step 2 as highly concentrated acid, higher than the concentration at the azeotropic point (>20.2%). For example, such a concentration can be about 25 to about 45 weight % or between 25 and 36 weight %.

After step 4, various chlorides derivatives of (mainly iron chlorides, magnesium chloride and rare earth element in the form of chlorides) are next subjected to an iron extraction step. Such a step can be carried out for example by using the technology disclosed in WO2009/153321, which is hereby incorporated by reference in its entirety.

In step 6, a hydrolysis at low temperature (155-350° C.) is carried out and pure $Fe_2O_3$ (hematite) is being produced and hydrochloric acid of at least 15% concentration is being regenerated. The method as described in WO 2009/153321 is processing the solution of ferrous chloride and ferric chloride, possible mixtures thereof, and free hydrochloric acid through a series of steps pre-concentration step, oxidation step where ferrous chloride is oxidized into ferric form, and finally through an hydrolysis step into an operational unit called hydrolyser where the ferric chloride concentration is maintained at 65 weight % to generate a rich gas stream where concentration ensures a hydrogen chloride concentration of 15-20.2% and a pure hematite that will undergo a physical separation step. Latent heat of condensation is recovered to the pre-concentration and used as the heating input with excess heat from the calcination stage (step 5).

The mother liquor left from the hydrolyser (step 6), after iron removal, is rich in other non-hydrolysable elements and mainly comprises magnesium chloride or possible mixture of other elements (various chlorides) and rare earth elements.

Rare earth elements in form of chlorides are highly concentrated in percentage into the hydrolyser operational unit (step 6) and are extracted from the mother liquor (step 10) where the processes defined in the present disclosure for recovering rare earth elements from aluminum-bearing materials can be employed. For example, rare earth elements under various forms can thus be extracted. For example, it can be under the form of oxides. REO. The processes of the present disclosure for recovering rare earth elements can allow, for example, to concentrate to a high concentration the following rare earth elements, within the hydrolyser: scandium (Sc), galium (Ga), yttrium (Y), dysperosium (Dy), cerium (Ce), praseodynium (Pr), neodynium (Nd), europium (Eu), samarium (Sm), gadolinium (Gd), lanthanum (La), erbium (Er). Of course, the at least one rare earth element that will be recovered will depend upon the nature of the startin material (aluminum-bearing material).

The spent acid liquor from steps 6 and 10 rich in value added metals, mainly magnesium, is processed to step 7. The solution is saturated with dry and highly concentrated gaseous hydrogen chloride from step 5, which results in the precipitation of magnesium chloride hexahydrate. The precipitate retained, is fed to a calcination stage step 8 where pure MgO (>98% wt.) is obtained and highly concentrated hydrochloric acid (for example of at least 38%) is regenerated and diverted to the leaching step (step 2). An alternative route for step 7 is using dry gaseous hydrochloric acid from step 8.

In step 9, metal chlorides unconverted are processed to a pyrohydrolysis step (700-900° C.) to generate mixed oxides and where hydrochloric acid from 15-20.2% wt. concentration can be recovered.

Figure 2:
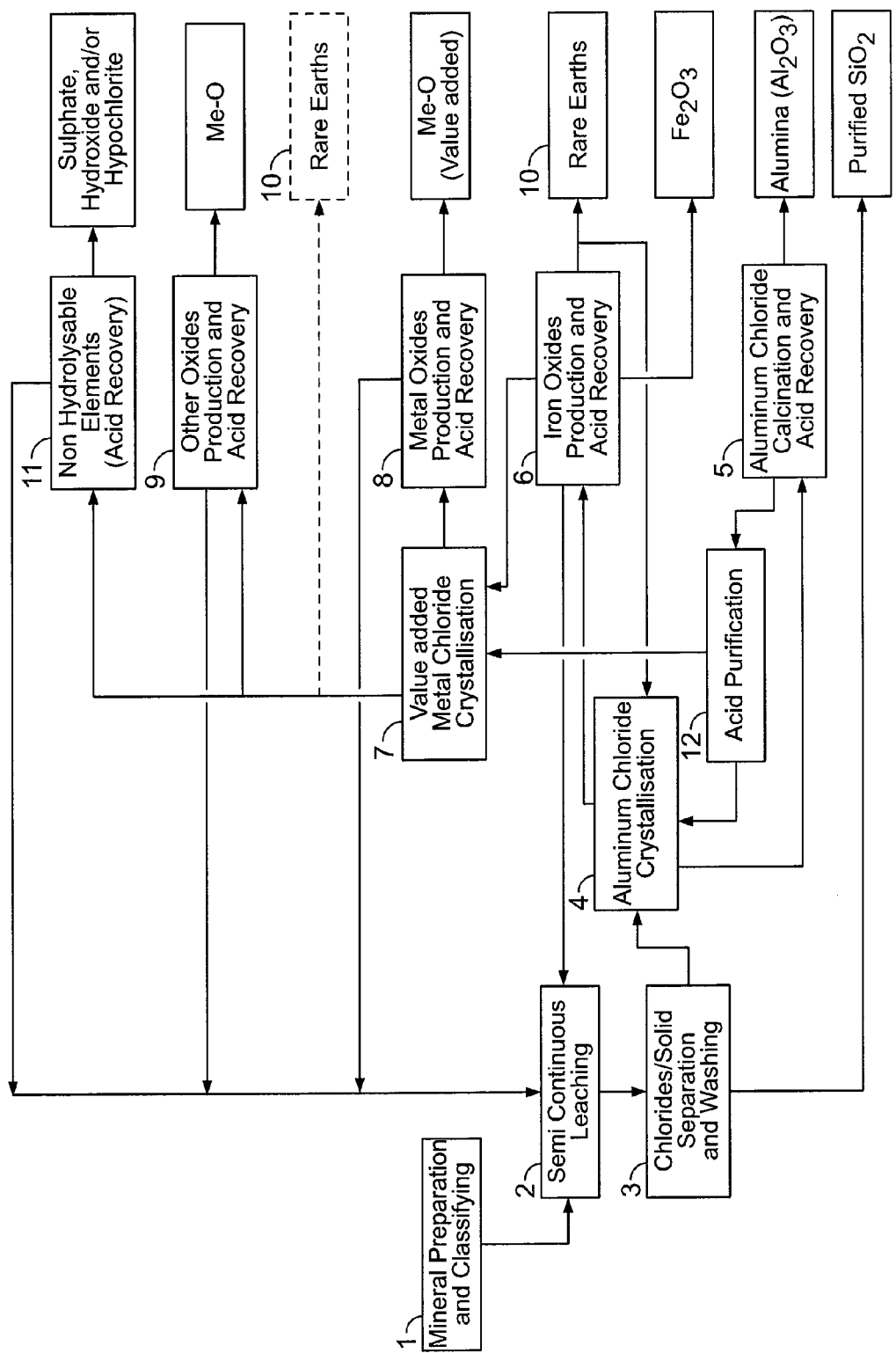
FIG. 2 shows a bloc diagram of another example of process for preparing alumina and various other products including rare earth elements, according to the present disclosure.

According to another example as shown in FIG. 2, the processes can be similar to the example shown in FIG., 1 but can comprise some variants as below discussed.

In fact, as shown in FIG. 2, the process can comprise (after step 6 or just before step 10) an internal recirculation back to the crystallization step 4. In such a case, The mother liquor from the hydrolyser (step 6) can be recirculated fully or partially to the crystallization of step 4 where a concentration increase will occur with respect to the non-hydrolyzable elements including rare earth elements.

Such a step can be useful for significantly increasing the concentration of rare earth elements, thereby facilitating their extraction in step 10.

With respect to step 7, the solution rich in magnesium chloride and other non-hydrolyzable products at low temperature is, as previously discussed, then brought up in concentration with dry and highly concentrated gaseous hydrogen chloride by sparging it into a crystallizer. This can result into the precipitation of magnesium chloride as an hexahydrate (for example after sodium and potassium chloride removal).

As shown in FIG. 2, an extra step 11 can be added. Sodium chloride can undergo a chemical reaction with sulfuric acid so as to obtain sodium sulfate and regenerate hydrochloric acid at the azeotropic point. Potassium chloride can undergo a chemical reaction with sulfuric acid so as to obtain potassium sulfate and regenerate hydrochloric acid at the azeotropic point.

Certain prophetical examples are hereby provided in the present disclosure for substantially selectively recovering, precipitating, extracting and/or isolating at least one rare earth element. This can be done, for example from the leachate and/or the precipitate and any other downstream derivatives, solutions, precipitates, compositions or liquors.

For example, recovering, precipitating, extracting and/or isolating at least one rare earth element can be carried out by:
- precipitating least one rare earth element (for example at a pH of about 6 to about 8, 7 to about 8, or 7 to about 7.5);
- using an ion exchange resin (for example, as described in U.S. Pat. No. 4,816,233 (hereby incorporated by reference in its entirety));
- extraction by means of solvent(s) (for example a liquid-liquid extraction can be carried out using di-(2-ethylhexyl)phosphoric acid (HDEHP (also called DEHPA or D2EHPA)), mono(2-ethylhexyl)2-ethylhexyl phosphonate (HEH/EHP), octyl phenyl phosphate (OPAP), 2-ethylhexylphosphonic acid mono-2-ethylhexyl ester (PC88A) and optionally toluene (for example as described in Kao et al. in Chemical Engineering Journal, Volume 119, Issues 2-3, Jun. 15, 2006, pages 167-174 (hereby incorporated by reference in its entirety)) or by means of extracted using an alkyl phosphate (for example as described in U.S. Pat. No. 3,013,859 (hereby incorporated by reference in its entirety));
- using an extracting agent (for example using bis(2,4,4-trimethylpentyl)monothiophosphinic acid or a derivative thereof);
- adsorption on activated charcoal (activated carbon adsorption) optionally modified with tributyl phosphate or on a polyurethane polyether foam (PUF); (for example as described in Zhou et al. in RARE METALS, Vol. 27, No. 3, 2008, p 223-227 (hereby incorporated by reference in its entirety))
- extraction with hollow fiber membranes; and
- using an electrowinning technology (for example as described in U.S. Pat. No. 2004/0042945 (hereby incorporated by reference in its entirety)).

For example, scandium can be precipitated (optionally using $HNO_3$) from a residual solution generated during the process (for example when iron is precipitated and/or when aluminum is precipitated).

For example, when substantially selectively precipitating, extracting and/or isolating at least one rare earth element from the leachate and/or the precipitate and any other downstream derivatives, various sequences can be carried out i.e. depending on the nature of the starting material and the rare earth elements present, a given rare earth element can be more easily extracted before or after another given rare earth element.

Figure 3:
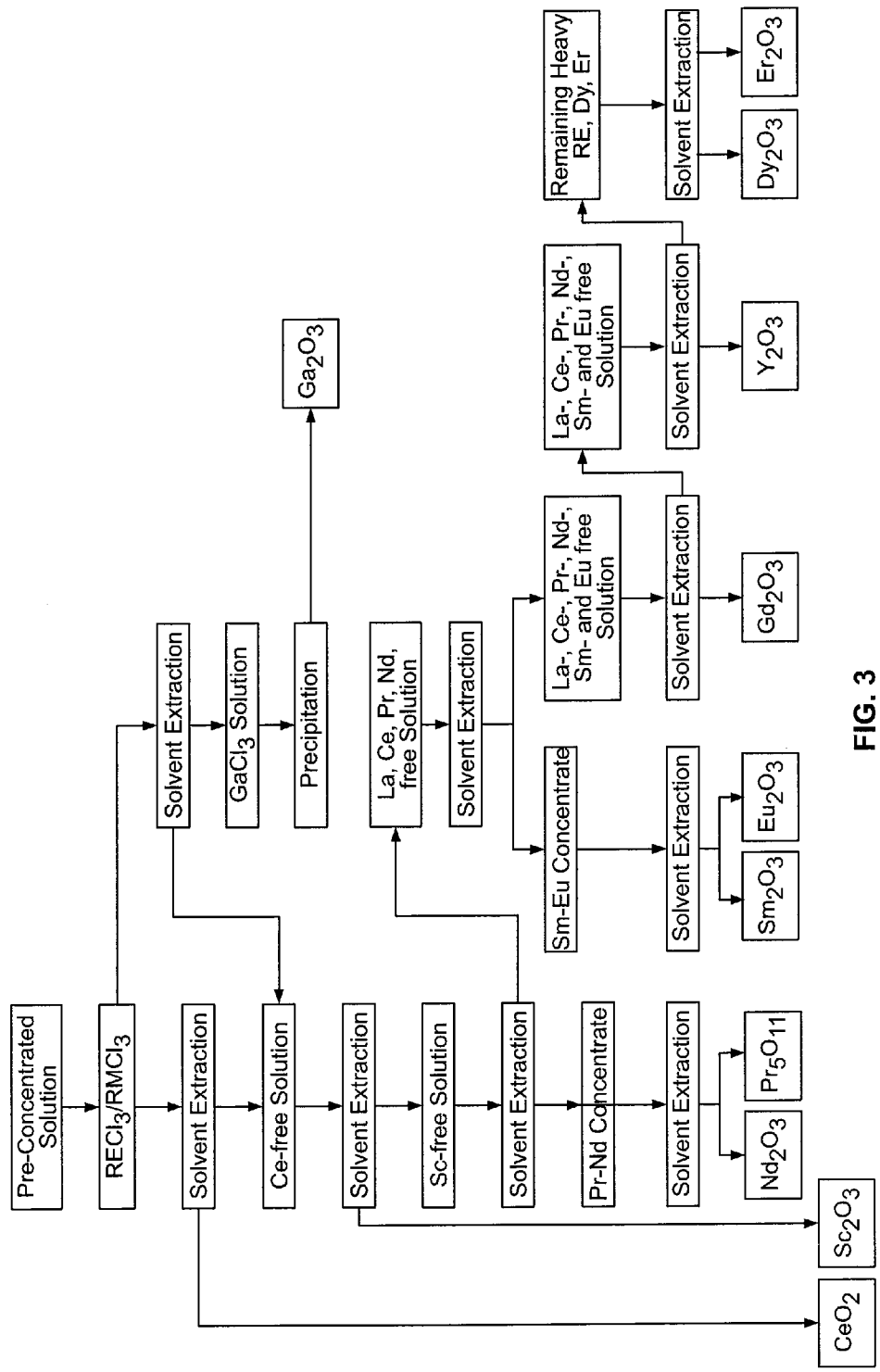
FIG. 3 shows a bloc diagram of an example of process for extracting rare earth elements according to the present disclosure.

For example, as shown in FIG. 3, in a mixture or liquor comprising HCl, water and rare elements in the form of chlorides, the mixture can be treated with an extracting agent in order to extract $GaCl_3$ therefrom, thereby obtaining a Ga-free solution. Such an extracting agent can be, for example, octyl phenyl phosphate (OPAP) or 2-ethylhexylphosphonic acid mono-2-ethylhexyl ester (PC88A) and toluene. $GaCl_3$ can then be precipitated and then converted into $Ga_2O_3$ by heating it.

Then, the Ga-free solution can be treated with an extracting agent (for example SME 529™, tri-butyl phosphate or di-isoamylmethyl phosphonate, di-(2-ethylhexyl)phosphoric acid, 7-(4-ethyl-1-methyloctyl)-8-hydroxyquinoline (Kelex 100™) in n-heptane with the addition of 10% n-decanol.) for substantially selectively extracting cerium chloride therefrom so as to obtain a Ce-free solution. $CeCl_3$ can be eventually converted into $CeO_2$.

Then, the Ce-free solution can be treated with an extracting agent such as di-(2-ethylhexyl)phosphoric acid or di-(2-ethylhexyl)phosphinic acid so as substantially selectively extract Sc and to provide a Sc-free solution. The extracted Sc can be treated with an oxidizer (such as NaOH) so as to provide $Sc_2O_3$.

Then, the various remaining rare earth elements (Pr, Nd, Sm, Eu, La, Gd, Y, Dy, Er etc.) in the Sc-free solution can be extracted in different possible orders.

For example, it has to be noted that the process schematized in FIG. 3 can be used as a component of various other processes such as the process schematized in FIG. 1 or in FIG. 2. For example, the step 10 of FIGS. 1 and 2 can be the process schematized in FIG. 3.

Figure 4A:
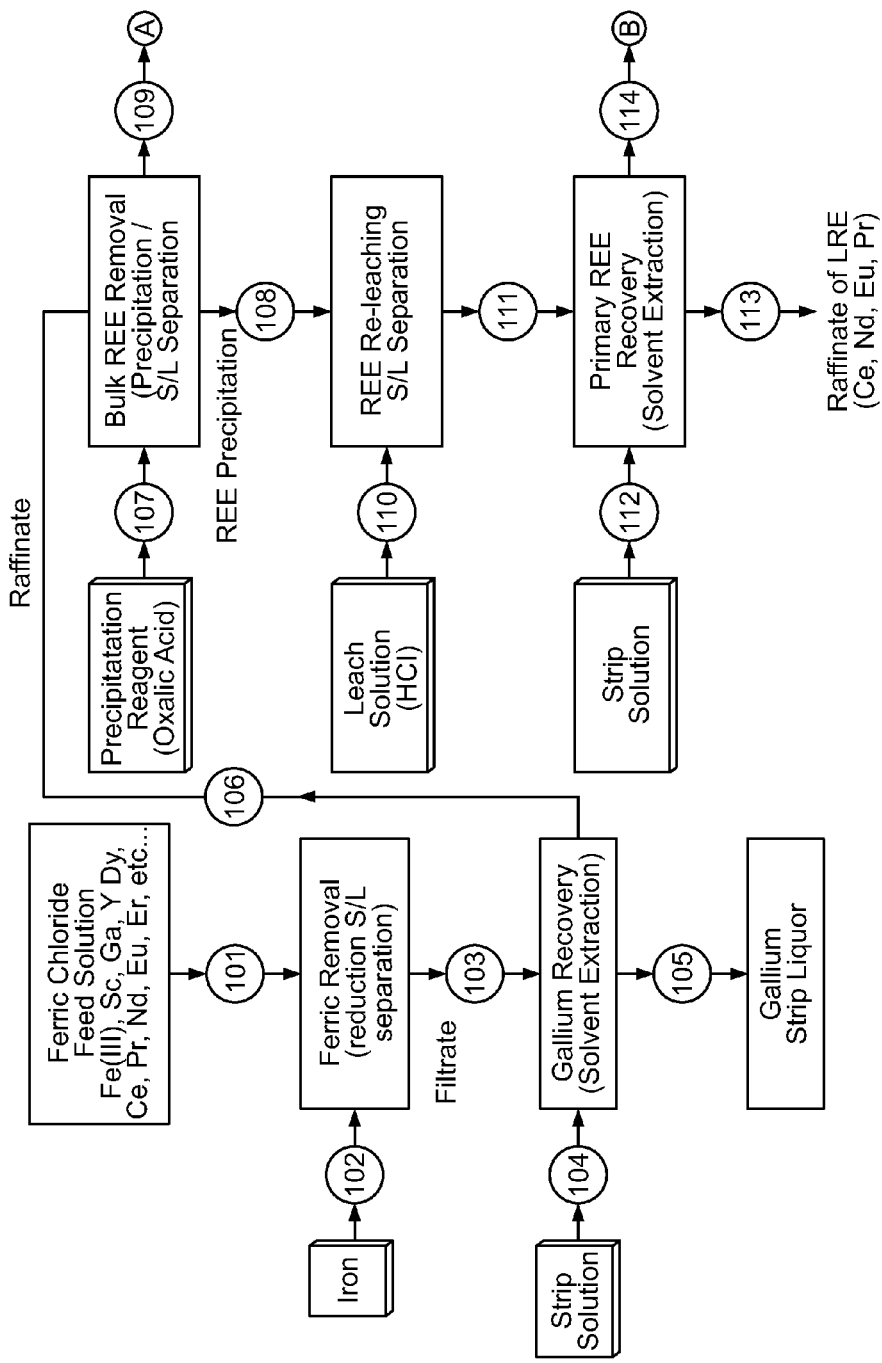
FIGS. 4a and 4b show a bloc diagram of another example of a process for extracting rare earth elements according to the present disclosure.
Figure 4B:
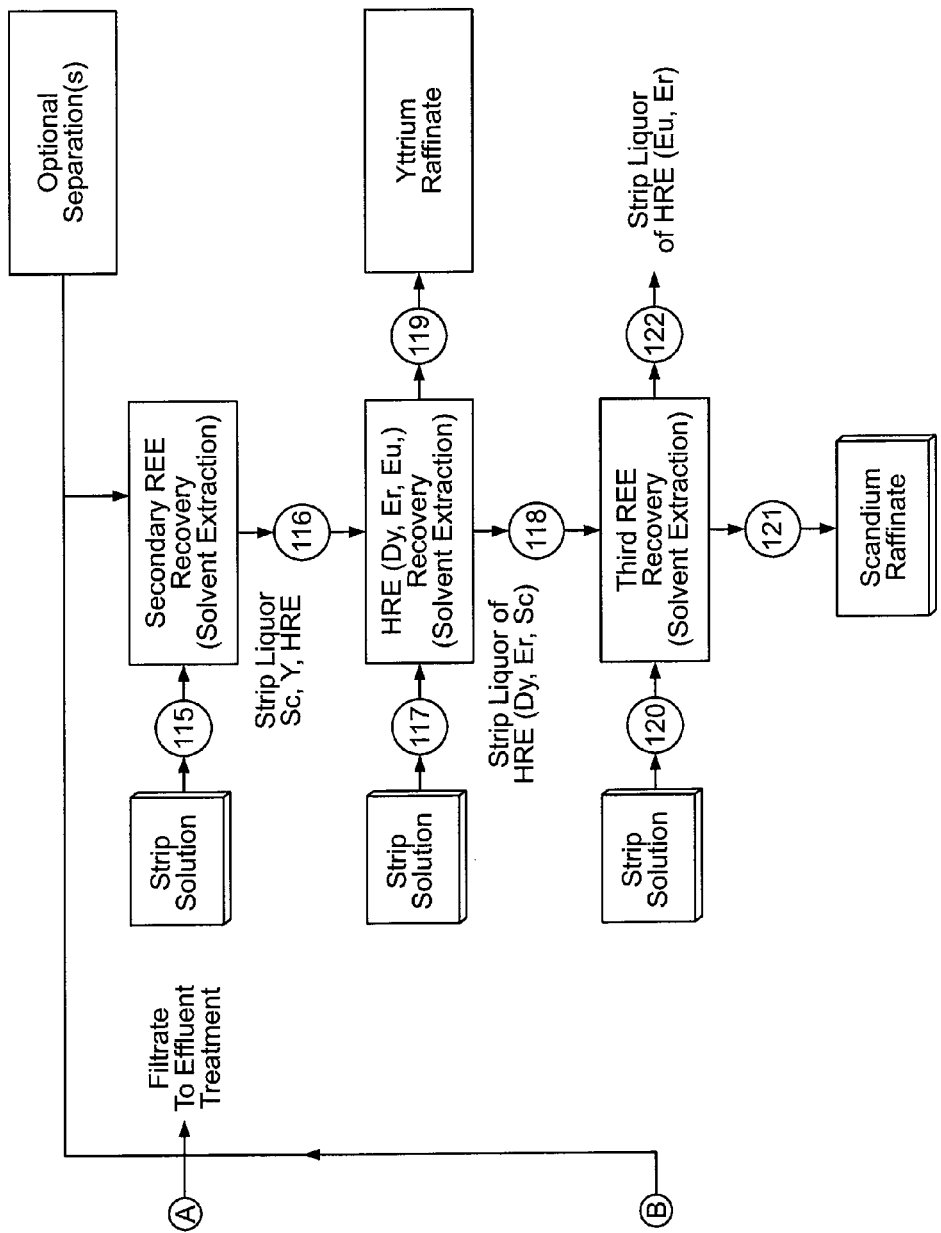

For example, as shown in FIGS. 4a and 4b, a process for extracting rare earth elements can comprise:
Ferric reduction to ferrous using iron;
Separation of gallium from the ferrous chloride solution;
Precipitation and pre-concentration of rare earth elements from the raffinate;
Re-leaching and fractioning of the rare earth elements into light (LRE) and heavy (HRE) groups;
Separation of yttrium from scandium and heavy rare earth elements; and
Separation of scandium and heavy rare earth elements The reduction of ferric to ferrous with a reducing agent (such as metallic iron) can be used so as to prevent iron coextraction or iron precipitation. The reaction time can be very short and it can generate heat.

As shown in FIGS. 4a and 4b, The ferric chloride feed solution 101 can be fed to an agitated reaction tank and a reducing agent (for example metallic iron 102) can added so as to allow for converting ferric chloride to ferrous chloride (see "Ferric Removal"). After a solid-liquid separation (s/l separation), the resulting filtrate 103 can be further treated in a gallium extraction circuit. A filter cake, containing solid material and iron, can be dewatered and the resulting slurry can then be prepared for disposal.

Gallium can then be extracted with an organic solution containing an extracting agent (for example tri-butyl phosphate (TBP) dissolved in kerosene) (see "Gallium Recovery"). The rare earth and iron can thus be left in the raffinate. The extraction can vary as a function of the chloride ion concentration. For example, the higher chloride ion concentration, the stronger tendency for gallium complex formation and the better extraction.

For example, for gallium (recovery from hydrochloric acid solutions, reagents such as tri-butyl phosphate or tertiary amines (e.g. Alamine 336) can be used. For example, when increasing hydrochloric acid (HCl) concentration, gallium extraction can rise to a maximum and can then decrease again. For example, HCl concentration can be increased up to about 4 M HCl for the gallium extraction. Under these conditions, gallium can be present in the form of $HGaCl_4$ complex and TBP extracted gallium as a trisolvate ($HGaCl_4 \cdot 3TBP$) (for example when the extracting agent is TBP).

Co-extracted iron, accumulated in the organic phase can be scrubbed with hydrochloric acid (see "Gallium Strip Liquor"). The resulting organic solution, containing gallium can be fed to a stripping circuit where gallium is stripped with water 104. The raffinate 106, containing ferrous chloride and the rare earth elements, can then be fed to the rare earth precipitation section (see "Bulk REE Removal"). The final strip liquor 105 contains gallium.

For example, oxalate precipitation of rare earth elements result in very low solubility of the compounds in aqueous solution. The precipitation of rare earth oxalates can be achieved by addition of a precipitation reagent 107. For example, oxalic acid 107 can be used for the precipitation. For example, precipitating agent that are effective for precipitating rare earth elements of the trivalent (such as oxalate (from oxalic acid)) can be used. For example, such precipitating agents can have provide a very low solubility in aqueous solution to so-formed precipitate.

An overflow from the primary rare earth elements precipitation 109 can be fed to a ferrous treatment circuit. After filtration, the filter cake, containing the rare earth elements, can be fed to a washing and dewatering unit. A resulting slurry 108 can then be prepared for re-leaching (see "REE-Re-leaching"). Re-leaching of the rare earth filter cake can be carried out using hydrochloric acid 110.

From a pre-concentrated and pH adjusted chloride solution 111, that contains for example about 150 to about 250 g/L, rare earth elements yttrium, scandium and the heavy rare earth (HRE) are extracted (see "Primary REE Recovery") with an extracting agent (for example (di-(2-ethylhexyl) phosphoric acid (D2EHPA) or 2-ethylhexylphosphonic acid mono-2-ethylhexyl ester (PC88A (also called Ionquest™801) in kerosene)). Scandium, the other HRE and also yttrium can be extracted and leaving the light rare earth elements (LRE) in a raffinate 113.

A loaded organic phase can then be selectively scrubbed with hydrochloric acid (2 M HCl) to remove the co-extracted LRE. A secondary scrubbing section can remove europium by using weak hydrochloric acid (1 to 1.5 M HCl). The extract, containing yttrium, scandium and the HRE, can then be stripped with strong acid (3.5 M HCl) 112.

The HRE strip liquor 114, containing yttrium and scandium, can be treated further to obtain more than 90% $Y_2O_3$ and $Sc_2O_3$ in a first circuit of a double solvent extraction purification process. In a first step, the aqueous solution, containing about 25 g/L (of rare earth elements in the form of oxides) and 0.4 M HCl, can be brought into contact with an extracting agent (for example (di-(2-ethylhexyl)phosphoric acid (D2EHPA) or 2-ethylhexylphosphonic acid mono-2-ethylhexyl ester (PC88A (also called Ionquest™801) in kerosene)) (see "Secondary REE Recovery"). The loaded organic phase is then scrubbed with diluted hydrochloric acid. Scandium, yttrium and HRE can be extracted by the reagent and finally stripped with strong hydrochloric acid 115 at a high oxide/acid ratio. The final strip liquor would have a concentration in rare earth elements oxides of about 40 g/L and about 1 M HCl. This solution is partially neutralized.

This pre-treated strip liquor 116 can be further extracted with an extracting agent (for example tri-butyl phosphate (TBP) in kerosene). The treatment can be done in a multi stage procedure, and ending up in a final stripping of the loaded organic with water 117. All HRE and scandium can thus extracted, leaving yttrium in a raffinate 119. A final strip liquor 118, containing HRE, forms the source for further separation of scandium and heavy rare earth. In order to do so, various possible extracting agents can be used such as di-(2-ethylhexyl)phosphoric acid.

The separation of scandium from other HRE, (for example dysprosium and erbium) can be carried out using a further solvent extraction purification circuit, similar to the yttrium separation and purification process and previously described. Thus, the extracting agent can be the same or a different one, the strip solution 120 can be the same than 117, thereby providing a scandium raffinate 121 and a strip liquor 122 comprising europium and erbium.

As an alternative, yttrium can be extracted as described in U.S. Pat. No. 3,751,553 (hereby incorporated by reference in its entirety). In fact, yttrium can be extracted starting from a xenotime concentrate. It can be done by using three solvent extraction circuits. In a first step, DEHPA can be used to separate yttrium. In a second step, tri (caprylmethyl)ammonium nitrate (Aliquat 336) can be used to extract and separate cerium and leave yttrium in the raffinate. In a third step, Tm, Yb, and Lu can be extracted by means of tri (caprylmethyl) ammonium thio cyanate. In this extraction loop, yttrium behaves like a cerium element. From this step, high-purity of yttrium oxide can be obtained.

According to another alternative, yttrium oxide can be extracted in two steps i.e. tri (caprylmethyl)ammonium nitrate can be used to separate a mixture La—Er/Y—Lu and then, a purification of yttrium is carried out using versatic acid.

Solvent extraction is a selective separation procedure for isolating and concentrating valuable elements from an aqueous solution with the aid of an organic solution. In the procedure the aqueous solution containing the element of interest, often at a low concentration and together with other dissolved substances (pollutants), is mixed (extraction) with an organic solvent containing a reagent. The element of interest reacts with the reagent to form a chemical compound that is more soluble in the organic than in the aqueous solution. As a consequence, the element of interest is transferred to the organic solution.

Subsequently, in order to recover the extracted substance, the organic solution is mixed (stripping) with an aqueous solution whose composition is such that the chemical compound between the element and the reagent is split and, thus, the element is recovered in the "new" aqueous solution, in a pure form. The concentration of the element in the "new" aqueous solution may be increased, often to 10-100 times that of the original aqueous solution, through adjustment of the liquid flow rates. Freed from the extracted element, the organic solution is returned for further extraction, either directly or after a fraction of it has been cleansed of impurities.

Important factors that govern this solvent extraction process can be, for example, the number of extraction, scrubbing and stripping stages, organic solvent concentration and diluent.

In a typical solvent extraction process, the aqueous phase, containing the rare earth elements, can be for example a chloric or nitric acidic solution. The organic phase comprises an extracting agent as those recited in the present disclosure or alternatives in an organic solvent such as an aliphatic diluent.

Solvent extraction technique can be used as separation and purification procedure for the rare earth elements. Some of the following properties are particularly relevant when selecting an extracting agent or chemical extractant:

High selectivity over other unwanted metals and acids during the extraction process,
High transfer capacity on the extractant,
Good chemical stability,
Fast kinetics.

For example, precipitation denotes the removal of the rare earth elements from solution by the addition of a chemical reagent to form a new, less soluble (solid) compound. For example, a complete precipitation can be carried out by oxalate, hydroxide, or other compounds.

Hydroxide precipitation and double sulphate can also be used. For large scale operation, ammonia can be used for carrying out hydroxide precipitation from nitrate or chloride solutions. The double sulphates $RE_2(SO_4)_3 \cdot Na_2SO_4 \cdot nH_2O$ can be precipitated by either addition of sodium sulphate to the solution containing rare earth elements. The precipitation reaction of trivalent rare earth elements in aqueous solution is according to the following equation:

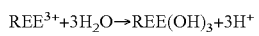
$$REE^{3+}+3H_2O \rightarrow REE(OH)_3+3H^+$$

The below presented examples are non-limitative and are used to better exemplify the processes of the present disclosure.

Example 1

Preparation of an Aluminum-Bearing Material Sample

The aluminum-bearing material (for example argillite) can be finely crushed in order to help along during the following steps. For example, micronization can shorten the reaction time by few hours (about 2 to 3 hours). In order to remove most of the iron, a leaching step at room temperature is optionally carried out between the crushing step and the calcination step. This operation is, for example, carried out with hydrochloric acid HCl (12 M or 32 wt %) and an argillite/acid ratio (weight/volume) of 1:5 is used. Depending on experimental conditions (sizes of the particles, time of treatment, agitation system), about 65% to about 93% of the iron can then be dissolved. However, this leaching step can also bring in a certain percentage of the aluminum (0-5%). The last step of the preparation of argillite comprises calcining the pretreated argillite. This can be accomplished at a calcinating temperature greater than 550° C. for a period of about 1 to 2 hours. For example, a heat treatment makes it possible to increase the quantity of extracted aluminum by about 30% to about 40% for the same period of time. In others words, the quantity of extracted aluminum is doubled. When leaching at room temperature is carried out, a phase separation before calcination can be made in order to recover the acid and reduce heating costs.

Acid Leaching

Acid leaching can comprise reacting the crushed and roasted argillite with an acid solution (for example HCl) at elevated temperature during a given period of time. For example, the argillite/acid ratio can be of about of 1:10 (weight/volume), the HCl concentration can be of about 6 M or about 18 to 20 wt %, the temperature can be of about 100° C. to about 110° C., and the reaction time can be of about 30 minutes to about 7 hours. Under such conditions, more than about 90% of the aluminum and about 100% of the iron can be extracted in addition to impurities. Alternatively, the leaching can be carried out at a temperature of about 150° C. to about 175° C. at a pressure of about 350 KPag to about 500 KPag during about 4 to about 7 hours.

During the second half of such a treatment (for example the last 2 or 3 hours), a portion of the excess acid can be recovered by flashing and condensation. Once the extraction is terminated, the solid (argillite impoverished in metals) can be separated from the liquid by decantation or by filtration, after which it is washed. The residual leachate and the washing water may be completely evaporated. The corresponding residue can thereafter be counter currently washed many times with water so as to decrease acidity and to lower the quantities of base used (for example, NaOH, KOH, $Ca(OH)_2$, $Mg(OH)_2$, etc.) that are required to adjust the pH during iron removal. The acid recovered will can be re-utilized after having adjusted its titer either by adding either gaseous HCl, or by adding concentrated HCl (12 M). After the reaction, the titer of the acid can vary from about 4 M to about 6 M depending on experimental conditions. With respect to the solid, it represents about 65% to about 75% of the initial mass of argillite, it can be valorized and be used again either as an ion exchange resin, or as an adsorbent.

Alternatively, the HCl leaching can be carried out under pressure (so to increase the reaction temperature) into an autoclave.

The rare earth element(s) recovery can be made, for example, at this stage, after carrying out the above mentioned acid leaching.

Removal of Iron

Several alternatives are proposed in the present disclosure for carrying out iron removal. For example, iron removal can be carried out by substantially selectively precipitating iron ions at certain pH values. Alternatively, some extracting agents can be used as described in WO2008141423. A membrane can also be used in combination with such extracting agents For example, removal of iron can be carried out by ionic precipitation of the latter in basic medium for example at a pH of at least 10 or at a pH of about 11.5 to about 12.5. The pH can also be about 3 to about 6, or about 3 to about 5 or about 3 to about 4. Such a step can be made by adding a solution of NaOH, for example at a concentration of 10 M. Other bases such as KOH can also be used. Then, all that is required is to separate the solid portion from the liquid portion by filtration, decantation or centrifugation and to rinse the solid by means of a diluted base, such as a solution of NaOH (for example NaOH at a concentration of 0.01 M to 0.02 M). Then, the solid is washed conter currently with water. The liquid portion comprises aluminum and alkaline-earths A substantially complete removal of the iron and of nearly all the impurities (other metals) can thus be achieved as insoluble and washed hydroxides. Optionally, it is possible to recover iron by using a refining step by liquid-liquid extraction through a hollow fiber membrane.

Alternatively, removal of iron can be carried out by using an extracting agent and a hollow fiber membrane. Various extracting agents that could substantially selectively complex iron ions over aluminum ions (or aluminum ions over iron ions) could be used in such a step depending an Al/Fe ratio. For example, extraction can be carried out by using HDEHP (or DEHPA) di(2-ethylhexyl)phosphoric acid) as an extracting agent adapted to complex iron ions. A concentration of about 1 M of HDEHP can be used in an organic solvent, such as heptane or any hydrocarbon solvent. Such an extraction can require relatively short contact times (few minutes). For example, the pH of the order of 2 can be used and aqueous phase/organic phase ratio can be of about 1:1. It was observed that is possible to extract from 86% to 98% iron under such conditions. It will be understood that in the present case, iron is trapped in the organic phase. To recover iron in an aqueous phase, a reverse extraction with hydrochloric acid (2 M or 6 M) and organic phase/acidic phase ratio of about 1:0.5 can then be carried out. In such a case, the resulting aqueous phase is rich in $Fe^{3+}$ ions.

The rare earth element(s) recovery can be made, for example, at this stage, after carrying out the above mentioned iron recovery.

With solvent extraction using countercurrent techniques, hydrochloric acid stripping and then contacting with MgO solution, therefore precipitating the rare earth elements in the form of hydroxide and then converting the products into their corresponding oxide into a calcination device.

Aluminum Recovery

This step can also be carried in various ways. For example, aluminum ions can be precipitated under the form of $Al(OH)_3$ (for example an hydrated form of $Al(OH)_3$) at a pH of about 7 to about 9 or about 7.5 to about 8.5 or about 8. Alternatively, the aluminum ions can be reacted with an extracting agent as descried in WO2008141423.

The solution obtained from the previous step using either the precipitation or the extraction technique is relatively clean and mainly contains aluminum for example about 90% to about 95% or even as high as about 90% to about 99.8% (without the alkaline-earths in the case of precipitation). Recovery of the latter can be carried out by liquid-liquid extraction for example by using a same hollow fiber membrane and an extracting agent that is adapted to complex at least substantially selectively aluminum over other metals or residues. For example, bis(2,4,4-trimethylpentyl)phosphinic acid (such as the one sold under the name Cyanex™272) can be used as an extracting agent specific to aluminum. For example, this extracting agent can be used at a concentration of about 20% v/v in an organic solvent such as heptane. The ratios between the aqueous phase and the organic phase can be of about 1:1 to about 1:3. For example, the extraction temperatures can be of about 40° C. and the pH can be maintained at about 2.5 to about 3.5. It was observed that such a technique makes it possible to extract more than 70-90% of the aluminum. After the aluminum has been trapped in the organic phase, it can be recovered in the form of a concentrate of $Al^{3+}$ ions by using a back extraction. For example, the reverse extraction can be carried out at a temperature of about 40° C. with hydrochloric acid (for example at a concentration of 6 M). Under this condition, more than 90% of aluminum can be recovered.

The rare earth element(s) recovery can be made, for example, at this stage, after carrying out the above mentioned aluminum recovery.

Then, $Al^{3+}$ can be converted into aluminum hydroxide (for example an hydrated form of $Al(OH)_3$) by addition of a base such as NaOH. Finally, $Al(OH)_3$ can be converted into alumina (alumina $Al_2O_3$) by r calcinating $Al(OH)_3$ for example at a temperature of about 800° C. to 1200° C.

Further purification can be performed by recrystallization.

Rare Earth Elements Recovery

Rare earth elements recovery can then be made, for example, at this stage by using any of the technology previously mentioned for doing so. For example, the at least one rare earth element contained in the residual solutions obtained from the above-mentioned process. For example, the at least one rare earth element can be in low concentration for example at a concentration of less than about 50, about 25, 15, 10, 5, 4, 3, 2 or 1 ppm in the lixiviate or leachate or a solution obtained during the process. The rare earth elements can be concentrated in the latter stage of the process prior to extraction with solvent(s). It was demonstrated that through an internal concentration loop, concentration can be significantly increased (for example from 100 to 1000 times) thereby providing more effective conditions for substantially selectively precipitating, extracting and/or isolating at least one rare earth element.

Example 2

As a starting material a sample of clay (argillite) was obtained from the Grande Vallée area in Québec, Canada.

These results represent an average of 80 tests carried out from samples of about 900 kg each. These tests were carried out by a using a process as shown in FIG. 1.

Crude clay in the freshly mined state after grinding and classification had the following composition:
$Al_2O_3$: 15%-26%;
$SiO_2$: 45%-50%;
$Fe_2O_3$: 8%-9%;
MgO: 1%-2%;
Rare earth elements: 0.04%-0.07%;
LOI: 5%-10%.

This material is thereafter leached in a two-stage procedure at 140-170° C. with 18-32 weight % HCl. The HCl solution was used in a stoichiometric excess of 10-20% based on the stoichiometric quantity required for the removal of the acid leachable constituents of the clay. In the first leaching stage of the semi-continuous operation (step 2), the clay was contacted for 2.5 hours with required amount or certain proportion of the total amount of hydrochloric acid. After removal of the spent acid, the clay was contacted again with a minimum 18 weight % hydrochloric acid solution for about 1.5 hour at same temperature and pressure.

The leachate was filtered and the solid was washed with water and analyzed using conventional analysis techniques (see step 3 of FIG. 1). Purity of obtained silica was of 95.4% and it was free of any chlorides and of HCl.

After the leaching and silica removal, the concentration of the various metal chlorides was:
$AlCl_3$: 15%-20%;
$FeCl_2$: 4%-6%;
$FeCl_3$: 0.5%-2.0%;
$MgCl_2$: 0.5%-2.0%;
Free HCl: 5-50 g/l Spent acid was then crystallized using about 90 to about 98% pure dry hydrochloric acid in gas phase in two stages with less than 25 ppm iron in the aluminum chloride hexahydrate formed. The concentration of HCl in solution (aqueous phase) was about 25 to about 32% The recovered crystallized material (hydrate form of $AlCl_3$ having a minimum purity of 99.8%) was then calcined at 930° C. or 1250° C., thus obtaining the α-portion of the alumina.

HCl concentration in gas phase exiting the calcination stage was having a concentration of about 21 to about 32% by weight and was used (recycled) for crystallization of the $AlCl_3$ and $MgCl_2$. Excess of hydrochloric acid is absorbed at the required and targeted concentration for the leaching steps.

Iron chloride (about 90% to about 95% in ferric form) is then sent to a hydrothermal process in view of its extraction as pure hematite ($Fe_2O_3$). This can be done by using the technology described in WO2009/153321 of low temperature hydrolysis with full heat recovery from calcining, pyrohydrolysis and leaching stage.

Before step 10 (in both processes of FIGS. 1 and 2) it was demonstrated that about 90 to about 98% by weight of the elements (Al, Fe, Mg and rare earths elements such as (Sc, Ga, Y, Ce) found in the starting material were recovered. It can be estimated that the processes for recovering rare earth elements from an aluminum-bearing material disclosed in the present disclosure can be efficient for recovering about 90% of the rare earth elements. Thus, with respect to the examples of processes provided in FIGS. 1 and 2, it can be estimated that the overall yield for recovering the at least one rare earth element from the aluminum-bearing material would be about 80% to about 90%.

Rare earth elements can be extracted from the mother liquor of the hydrolyzer (where silica, aluminum, iron and a great portion of water have been removed) following pre-concentration from crystallization to the hydrolyzer. In the form of chlorides the rare earth elements (RECl) are considerably concentrated and ready to be extracted. Rare earth elements have demonstrated to concentrate by a factor 5 to 10 in average within the hydrolyzer itself on a single pass through it (without any concentration loop). The concentration factors obtained within the hydrolyser (single pass) were as follows:

Ce: >6

La: >9

Nd: >7

Y: >9

The person skilled in the art would thus clearly understand that such a concentration could be considerably more increased when carrying out a concentration loop.

Remaining magnesium chloride is sparged with dry and highly concentrated hydrochloric acid and then calcinated to MgO while recovering acid at its azeotropic point.

Mixed oxides containing other non-hydrolyzable components were then undergoing a pyrohydrolysis reaction at 700-800° C. and recovered acid (15-20.2% wt.) was rerouted for example to the leaching system.
Overall Yields Obtained:
$Al_2O_3$: 93-95% recovery;
$Fe_2O_3$: 98-99.5% recovery;
Rare earth elements: 95% minimum recovery (mixture);
MgO: 96-98% recovery;
Material discarded: 0-5% maximum;
HCl global recovery: 99.75% minimum;
HCl strength as feed to leaching 15-32%;
Red mud production: none.

Example 3

A similar feed material (bauxite instead of clay) was processed as per in example 2 up to the leaching stage and revealed to be easily leachable under the conditions established in example 2. It provided an extraction percentage of 100% for the iron and over 95% for aluminum. The process was found to be economically viable and no harmful by-products (red mud) were generated. A rare earth elements recovery (as a mixture) of about 90 to about 95% (by weight as compared to the starting material) was observed Samples tested had various concentrations of $Al_2O_3$ (up to 51%), $Fe_2O_3$ (up to 27%) and MgO (up to 1.5%).

The processes of the present disclosure provide a plurality of important advantages and distinction over the known processes The processes of the present disclosure can provide fully continuous and economical solutions that can successfully extract alumina from various type of minerals while providing ultra pure secondary products of high added value including highly concentrated rare earth elements. The technology described in the present disclosure can allow for an innovative amount of total acid recovery and also for a ultra high concentration of recovered acid. When combing it to the fact that combined with a semi-continuous leaching approach that favors very high extraction yields and allows a specific method of crystallization of the aluminum chloride and concentration of other value added elements such as rare earth elements.

Specifically through the type of equipment used (for example vertical roller mill) and its specific operation, raw material grinding, drying and classifying can be applicable to various kinds of mineral hardness (furnace slag for example), various types of humidity (up to 30%) and incoming particle sizes. The particle size established provides the advantage, at the leaching stage, of allowing optimal contact between the minerals and the acid and then allowing faster kinetics of reaction. Particles size employed reduces drastically the abrasion issue and allows for the use of a simplified metallurgy/lining when in contact with hydrochloric acid.

A further advantage of the processes of the present disclosure is the combined high temperature and high incoming hydrochloric acid concentration. Combined with a semi continuous operation where the free HCl driving force is used systematically, iron and aluminum extraction yields do respectively reach 100% and 98% in less than about 40% of the reference time of a basic batch process. Another advantage of higher HCl concentration than the concentration at azeotropic point is the potential of capacity increase. Again a higher HCl concentration than the concentration of HCl at the azeotropic point and the semi-continuous approach represent a substantial advance in the art.

Another advantage in that technique used for the mother liquor separation from the silica after the leaching stage countercurrent wash, is that band filters provide ultra pure silica with expected purity exceeding 98%.

The crystallization of $AlCl_3$ into $AlCl_3.6H_2O$ using dried, cleaned and highly concentrated gaseous HCl as the sparging agent allows for a pure aluminum chloride hexahydrate with only few parts per million of iron and other impurities. A minimal number of stages can be required to allow proper crystal growth.

The direct interconnection with the calcination of $AlCl_3.6H_2O$ into $Al_2O_3$ which does produce very high concentration of gas allows the exact adjustment in continuous of the HCl concentration within the crystallizer and thus proper control of the crystal growth and crystallization process.

The applicants have now discovered fully integrated and continuous processes with total hydrochloric acid recovery for the extraction of alumina and other value added products such as rare earth elements from various materials that contain aluminum (clay, bauxite, slag, red mud etc.) containing aluminum. In fact, the processes allows for the production of pure alumina and other value added products purified such as purified silica, pure hematite, pure other minerals (ex: magnesium oxide) and rare earth elements. In addition, the processes do not require thermal pre-treatment before the acid leach operation. Acid leach can be carried out using semi-continuous techniques with high pressure and temperature conditions and very high regenerated hydrochloric acid concentration.

The advantage of the high temperature calcination stage, in addition for allowing to control the α-form of alumina required, is effective for providing a concentration of hydrochloric acid in the aqueous form (>38%) that is higher than the concentration of HCl at the azeotropic point and thus providing a higher incoming HCl concentration to the leaching stage. The calcination stage hydrochloric acid network can be interconnected to two (2) crystallization systems and by pressure regulation excess HCl can be being absorbed at the highest possible aqueous concentration. The advantage of having a hexahydrate incoming feed allows for a continuous basis to recover acid at a concentration that is higher than the azeotropic concentration. This HCl balance and double usage into three (3) common parts of the process and over azeotropic point is a substantial advance in the art.

Another advantage is the use of the incoming chemistry (ferric chloride) to the iron oxide and hydrochloric acid recovery unit where all excess heat load from any calcination part, pyrohydrolysis and leaching part is being recovered to preconcentrate the mother liquor in metal chloride, thus allowing, at very low temperature, the hydrolysis of the ferric chloride in the form of very pure hematite and the acid regeneration at the same concentration than at its azeotropic point.

A further major advantage of the instant process at the ferric chloride hydrolysis step is the possibility to concentrate rare earth elements in form of chlorides at very high concentration within the hydrolyser reactor. The advantage is that the processes of the present disclosure benefit from the various steps where gradual concentration ratios are applied. Thus, at this stage, having the silica, the aluminum, the iron and having in equilibrium a solution close to saturation (large amount of water evaporated, no presence of free hydrochloric acid) allows for taking rare earth elements in parts per million into the incoming feed and to concentrate them in high percentage portion directly at the hydrolyser. Purification of the specific oxides of the rare earth elements (REO) can then be performed using known techniques when in percentage levels. The advantage is doubled here: concentration at very high level of rare earth elements using integrated process stages and most importantly the approach prevents from having the main stream (very diluted) of spent acid after the leaching step with the risk of contaminating the main aluminum chloride stream and thus affecting yields in $Al_2O_3$. Another important improvement of the art is that on top of being fully integrated, selective removal of components allows for the concentration of rare earth elements to relatively high concentration (percentages).

Another advantage of the process is again a selective crystallization of $MgCl_2$ through the sparging from either the alumina calcination step or the magnesium oxide direct calcination where in both cases highly concentrated acid both in gaseous phase or in aqueous form are being generated. As per aluminum chloride specific crystallization, the direct interconnection with the calciner, the HCl gas very high concentration allows for exact adjustment in continuous of the crystallizer based on quality of magnesium oxide targeted. Should this process step (MgO production or other value added metal oxide) be required based on incoming process feed chemistry, the rare earth elements extraction point then be done after this additional step; the advantage being the extra concentration effect applied.

The pyrohydrolysis allows for the final conversion of any remaining chloride and the production of refined oxides that can be used (in case of clay as starting material) as a fertilizer and allowing the processing of large amount of wash water from the processes with the recovery hydrochloric acid in close loop at the azeotropic point for the leaching step. The advantage of this last step is related to the fact that it does totally close the process loop in terms of acid recovery and the insurance that no residues harmful to the environment are being generated while processing any type of raw material, as previously described.

A major contribution to the art is that the proposed fully integrated processes of the present disclosure is really allowing, among others, the processing of bauxite in an economic way while generating no red mud or harmful residues. In addition to the fact of being applicable to other natural of raw materials (any suitable aluminum-bearing material or aluminous ores), the fact of using hydrochloric acid total recovery and a global concentration that is higher than the concentration at the azeotropic point (20% to 38%), the selective extraction of value added secondary products and compliance (while remaining highly competitive on transformation cost) with environmental requirements, represent major advantages in the art.

It was thus demonstrated that the present disclosure provides fully integrated processes for the preparation of pure aluminum oxide using a hydrochloric acid treatment while producing high purity and high quality products (minerals) and recovering rare earth elements.

The person skilled in the art will thus understand that the processes of the present disclosure can be used in combination with various processes for treating aluminum-bearing materials. In fact, various different treatments can be carried out to the aluminum-bearing materials in the processes of the present disclosure including recovery of at least one rare element.

While a description was made with particular reference to the specific embodiments, it will be understood that numerous modifications thereto will appear to those skilled in the art. Accordingly, the above description and accompanying drawings should be taken as specific examples and not in a limiting sense.

What is claimed is:

1. A process for recovering at least one rare earth element and/or at least one rare metal chosen from In, Zr, Li or Ga from an aluminum-bearing material, said process comprising:
   leaching said aluminum-bearing material with HCl so as to obtain a leachate comprising at least one aluminum ion, at least one iron ion, said at least one rare earth element and/or said at least one rare metal, and a solid, and separating said leachate from said solid;
   substantially selectively removing said at least one aluminum ion from said leachate by carrying out a precipitation, by carrying out a liquid-liquid extraction, by using a hollow-fiber membrane, by using an extracting agent and/or by using an ion exchange resin, thereby obtaining a composition comprising said at least one iron ion, and said at least one rare earth element and/or said at least one rare metal;
   substantially selectively at least partially removing said at least one iron ion from said composition by carrying out a precipitation, by carrying out a liquid-liquid extraction, by using a hollow-fiber membrane, by using an extracting agent, by carrying out a hydrolysis and/or by using an ion exchange resin, thereby obtaining a liquor comprising said at least one rare earth element and/or said at least one rare metal; and
   substantially selectively removing said at least one rare earth element and/or said at least one rare metal from said liquor by carrying out a precipitation, by carrying out a liquid-liquid extraction, by using an adsorption technique, by using an extracting agent, by carrying out an electrowinning process and/or by using an ion exchange resin.

2. The process of claim 1, wherein said at least one aluminum ion is substantially selectively removed from said leachate by substantially selectively precipitating it from said leachate and removing it therefrom by carrying out a solid-liquid separation.

3. The process of claim 1, wherein said at least one aluminum ion is substantially selectively removed from said leachate by substantially selectively crystallizing it in the form of $AlCl_3.6H_2O$ and removing it therefrom by carrying out a solid-liquid separation.

4. The process of claim 2, wherein said at least one iron ion is substantially selectively removed from said composition by carrying out an hydrolysis.

5. The process of claim 3, wherein said at least one iron ion is substantially selectively removed from said composition by carrying out an hydrolysis so as to convert said at least one iron ion into $Fe_2O_3$ and removing said precipitated $Fe_2O_3$ from said composition by carrying out a solid-liquid separation, thereby obtaining said liquor comprising said at least one rare earth element and/or said at least one rare metal.

6. The process of claim 1, wherein said at least one rare earth element and/or said at least one rare metal is substantially selectively removed from said liquor by carrying out a precipitation.

7. The process of claim 1, wherein said at least one rare earth element and/or said at least one rare metal is substantially selectively removed from said liquor by means of an ion exchange resin.

8. The process of claim 1, wherein said at least one rare earth element and/or said at least one rare metal is substantially selectively removed from said liquor by using an extracting agent.

9. The process of claim 5, wherein said at least one rare earth element and/or said at least one rare metal is substantially selectively removed from said liquor by using an extracting agent.

10. The process of claim 5, wherein said at least one rare earth element and/or said at least one rare metal is substantially selectively precipitated, extracted and/or isolated from said liquor by means of a liquid-liquid extraction.

11. The process of claim 10, wherein said liquor comprises said at least one rare earth element under the form of a chloride and said at least one rare metal in the form of a chloride, and wherein said liquor is reacted with an extracting agent in order to substantially selectively extract gallium therefrom, thereby obtaining a Ga-free solution and an extracted gallium solution, and separating said solutions from one another.

12. The process of claim 1, wherein said process comprises:
   leaching said aluminum-bearing material with HCl so as to obtain a leachate and a solid residue, and separating said leachate from said solid residue;
   at least partially removing said at least one aluminum ion from said leachate by substantially selectively precipitating said at least one aluminum so as to obtain an iron-rich aqueous composition comprising said at least one rare earth element and/or said at least one rare metal and a precipitate, and removing said precipitate from said composition;
   substantially selectively precipitating said at least one iron ion from said iron-rich aqueous composition, and removing said precipitate therefrom, thereby obtaining thereby obtaining an iron-depleted aqueous composition comprising said at least one rare earth element and/or said at least one rare metal; and
   substantially selectively extracting said at least one rare earth element and/or said at least one rare metal from said iron-depleted aqueous composition.

13. The process of claim 12, wherein said at least one aluminum ion is precipitated in the form of $AlCl_3$ in a crystallizer by sparging gaseous HCl.

14. A process for recovering at least one rare earth element and/or at least one rare metal chosen from In, Zr, Li or Ga from an aluminum-bearing material, said process comprising:
- leaching said aluminum-bearing material with HCl so as to obtain a leachate comprising at least one aluminum ion, at least one iron ion, and said at least one rare earth element and/or said at least one rare metal, and a solid and separating said leachate from said solid;
- substantially selectively removing said at least one iron ion from said leachate by carrying out a precipitation, by carrying out a liquid-liquid extraction, by using a hollow-fiber membrane, by using an extracting agent, by carrying out a hydrolysis and/or by using an ion exchange resin, thereby obtaining a composition comprising said at least one aluminum ion, and said at least one rare earth element and/or said at least one rare metal; and
- substantially selectively at least partially removing said at least one aluminum ion from said composition by carrying a precipitation, by carrying out a liquid-liquid extraction, by using a hollow-fiber membrane, by using an extracting agent and/or by using an ion exchange resin, thereby obtaining a liquor comprising said at least one rare earth element and/or said at least one rare metal; and
- substantially selectively removing said at least one rare earth element and/or said at least one rare metal from said liquor by carrying out a precipitation, by carrying out a liquid-liquid extraction, by using an adsorption technique, by using an extracting agent, by carrying out an electrowinning process and/or by using an ion exchange resin.

15. The process of claim 14, further comprising at least one of
- at least partially removing said at least one iron ion from said leachate by substantially complexing said at least one iron ion with an extracting agent;
- selectively precipitating said at least one iron ion;
- selectively precipitating said at least one aluminum ion; and
- at least partially removing said at least one aluminum ion from said leachate by substantially complexing said at least one aluminum ion with another extracting agent.

16. The process of claim 14, wherein said process comprises:
- leaching said aluminum-bearing material with HCl so as to obtain a leachate and a solid residue, and separating said leachate from said solid residue;
- at least partially removing said at least one iron ion from said leachate by substantially selectively precipitating said at least one iron ion by reacting said leachate with a base so as to obtain an Al-rich aqueous composition comprising said at least one rare earth element and/or said at least one rare metal and a precipitate, and removing said precipitate from said composition;
- purifying said Al-rich aqueous composition by substantially selectively precipitating said at least one aluminum ion, thereby obtaining another composition comprising said at least one rare earth element and/or said at least one rare metal and another precipitate, removing said precipitate from said composition; and
- substantially selectively extracting said at least one rare earth element and/or said at least one rare metal from said another composition.

17. The process of claim 14, wherein said process comprises:
- leaching said aluminum-bearing material with HCl so as to obtain a leachate and a solid residue, and separating said leachate from said solid residue,
- at least partially removing said at least one iron ion from said leachate by substantially selectively precipitating said at least one iron ion by reacting said leachate with a base so as to obtain an Al-rich aqueous composition comprising said at least one rare earth element and/or said at least one rare metal and a precipitate, and removing said precipitate from said composition;
- substantially selectively extracting said at least one aluminum ion from said Al-rich aqueous composition by means of a hollow fiber membrane, or by a liquid-liquid extraction, and removing said extracted at least one aluminum ion, thereby obtaining an Al-depleted aqueous composition comprising said at least one rare earth element and/or said at least one rare metal; and
- substantially selectively extracting said at least one rare earth element and/or said at least one rare metal from said Al-depleted aqueous composition.

18. The process of claim 14, wherein said process comprises:
- leaching said aluminum-bearing material with HCl so as to obtain a leachate and a solid residue, and separating said leachate from said solid residue;
- at least partially removing said at least one iron ion from said leachate by substantially selectively complexing said at least one iron ion with an extracting agent so as to obtain an Al-rich aqueous composition comprising said at least one rare earth element and/or said at least one rare metal;
- purifying said Al-rich aqueous composition by substantially selectively precipitating said at least one aluminum ion, thereby obtaining another composition comprising said at least one rare earth element and/or said at least one rare metal and another precipitate, removing said precipitate from said composition; and
- substantially selectively extracting said at least one rare earth element and/or said at least one rare metal from said another composition.

19. The process of claim 14, wherein said process comprises:
- leaching said aluminum-bearing material with HCl so as to obtain a leachate and a solid residue, and separating said leachate from said solid residue;
- at least partially removing said at least one iron ion from said leachate by substantially selectively complexing said at least one iron ion with an extracting agent so as to obtain an Al-rich aqueous composition comprising said at least one rare earth element and/or said at least one rare metal;
- substantially selectively extracting said at least one aluminum ion from said Al-rich aqueous composition by means of a hollow fiber membrane, or by a liquid-liquid extraction, and removing said extracted at least one aluminum ion, thereby obtaining an Al-depleted aqueous composition comprising said at least one rare earth element and/or said at least one rare metal; and
- substantially selectively extracting said at least one rare earth element and/or said at least one rare metal from said Al-depleted aqueous composition.

20. The process of claim 14, wherein said at least one iron ion is substantially selectively removed from said composition by carrying out an hydrolysis or by carrying out a precipitation.

* * * * *